United States Patent
He

(10) Patent No.: US 12,254,185 B2
(45) Date of Patent: Mar. 18, 2025

(54) MANAGING OPERATIONS IN MEMORY SYSTEMS

(71) Applicant: Yangtze Memory Technologies Co., Ltd., Hubei (CN)

(72) Inventor: Youxin He, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 12 days.

(21) Appl. No.: 18/459,389

(22) Filed: Aug. 31, 2023

(65) Prior Publication Data
US 2025/0060878 A1   Feb. 20, 2025

(30) Foreign Application Priority Data

Aug. 16, 2023   (CN) .......................... 202311035300.9

(51) Int. Cl.
*G06F 3/06*   (2006.01)

(52) U.S. Cl.
CPC .......... *G06F 3/0611* (2013.01); *G06F 3/0656* (2013.01); *G06F 3/0659* (2013.01); *G06F 3/0679* (2013.01)

(58) Field of Classification Search
CPC .... G06F 3/0611; G06F 3/0656; G06F 3/0659; G06F 3/0679
See application file for complete search history.

(56) References Cited

U.S. PATENT DOCUMENTS

| | | | | |
|---|---|---|---|---|
| 9,251,891 | B1* | 2/2016 | Hu | G11C 16/26 |
| 10,832,789 | B1* | 11/2020 | Gupta | G11C 29/52 |
| 2013/0229868 | A1* | 9/2013 | Koh | G11C 16/10 |
| | | | | 365/185.03 |
| 2015/0012684 | A1* | 1/2015 | Avila | G06F 3/0688 |
| | | | | 711/103 |
| 2015/0012802 | A1* | 1/2015 | Avila | G11C 16/3418 |
| | | | | 714/773 |
| 2018/0307503 | A1* | 10/2018 | Peltz | G06F 13/161 |
| 2019/0114103 | A1* | 4/2019 | Shlick | G06F 3/0679 |
| 2020/0285416 | A1* | 9/2020 | Wu | G06F 3/0679 |
| 2021/0382652 | A1* | 12/2021 | Sharma | G06F 3/0613 |
| 2022/0137856 | A1* | 5/2022 | Siciliani | G06F 3/0679 |
| | | | | 711/154 |

* cited by examiner

*Primary Examiner* — Ryan Bertram
(74) *Attorney, Agent, or Firm* — Fish & Richardson P.C.

(57) ABSTRACT

Methods, systems, and apparatus for management of operations in a memory system are described. An example system includes a memory device and a memory controller. The memory device includes a first buffer, a second buffer, and a third buffer including a plurality of data buffers. The memory device receives a first portion of first data of a first request from the memory controller, and stores the first portion of the first data in the first buffer or a first data buffer of the third buffer. The memory controller sends a second request to the memory device. The memory device, in response to the second request, moves the first portion of the first data from the first buffer or the first data buffer to the second buffer. The memory device performs an operation in response to the second request without using the second buffer.

20 Claims, 12 Drawing Sheets

MANAGING OPERATIONS IN MEMORY SYSTEMS

CROSS-REFERENCE TO RELATED APPLICATIONS

This application claims priority to Chinese Patent Application No. 202311035300.9, filed on Aug. 16, 2023, which is hereby incorporated by reference in its entirety.

TECHNICAL FIELD

The present disclosure generally relates to memory systems, and more specifically, to management of operations of memory systems.

BACKGROUND

A memory system can include one or more memory components that store data. The memory components can be, for example, non-volatile memory components and volatile memory components. In general, a host system can utilize a memory system to store data in the memory components and retrieve data from the memory components.

SUMMARY

The present disclosure describes management of operations in memory systems.

In one aspect, the present disclosure describes a method performed by a memory device. The memory device includes a first buffer, second buffer, and a third buffer. The third buffer includes a plurality of data buffers. The method includes: receiving, by the memory device, a first portion of first data of a first request from a memory controller, wherein the first request comprises at least the first portion of the first data and a second portion of the first data; storing, by the memory device, the first portion of the first data in the first buffer or a first data buffer of the third buffer; receiving, by the memory device, a second request from the memory controller; in response to the second request, moving, by the memory device, the first portion of the first data from the first buffer or the first data buffer of the third buffer to the second buffer; performing, by the memory device, an operation in response to the second request without using the second buffer; sending, by the memory device, an execution result of the second request to the memory controller; receiving, by the memory device, the second portion of the first data from the memory controller; and storing, by the memory device, the second portion of the first data in a second data buffer of the third buffer.

In another aspect, the present disclosure describes a memory device. The memory device includes a first buffer, a second buffer, a third buffer, an array of memory cells, and a control logic. The third buffer includes a plurality of data buffers. The control logic is coupled to at least one memory storing programming instructions that, when executed by the control logic, cause the memory device to perform operations including: receiving a first portion of first data of a first request from a memory controller, wherein the first request comprises at least the first portion of the first data and a second portion of the first data; storing the first portion of the first data in the first buffer or a first buffer of the third buffer; receiving a second request from the memory controller; in response to the second request, moving the first portion of the first data from the first buffer or the first data buffer of the third buffer to the second buffer; performing an operation in response to the second request without using the second buffer; sending an execution result of the second request to the memory controller; receiving the second portion of the first data from the memory controller; and storing the second portion of the first data in a second data buffer of the third buffer.

In still another aspect, the present disclosure describes a system that includes a memory device and a memory controller. The memory device includes a first buffer, a second buffer, a third buffer, an array of memory cells, and a control logic. The third buffer includes a plurality of data buffers. The control logic is coupled to at least one memory storing programming instructions that, when executed by the control logic, cause the memory device to perform operations including: receiving a first portion of first data of a first request from the memory controller, wherein the first request comprises at least the first portion of the first data and a second portion of the first data; storing the first portion of the first data in the first buffer or a first buffer of the third buffer; receiving a second request from the memory controller; in response to the second request, moving the first portion of the first data from the first buffer or the first data buffer of the third buffer to the second buffer; performing an operation in response to the second request without using the second buffer; sending an execution result of the second request to the memory controller; receiving the second portion of the first data from the memory controller; and storing the second portion of the first data in a second data buffer of the third buffer.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
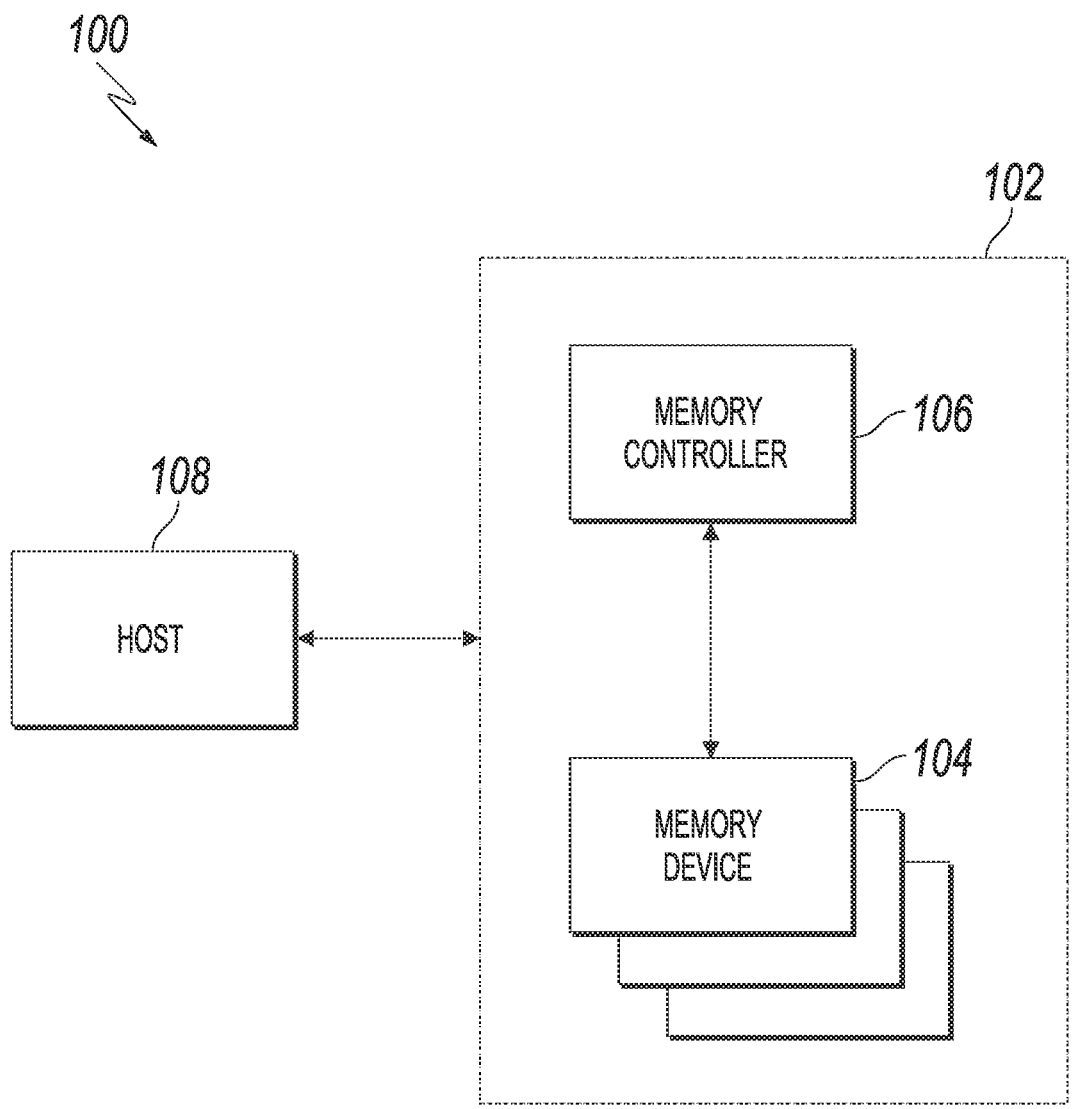
FIG. 1 shows a block diagram of an example system, in accordance with one or more implementations of the present disclosure.

A memory system can be a storage device, a memory module, or a hybrid of a storage device and memory module. Examples of storage devices and memory modules are described below in conjunction with FIG. 1 and FIGS. 2A and 2B. In general, a host system can utilize a memory system that includes one or more memory components, such as memory devices that store data. The host system can provide data to be stored in the memory device and can request data to be retrieved from the memory device.

A memory device can include multiple memory cells. Each memory cell can be configured with a different storage mode or state such as a single-level cell (SLC) or a multi-level cell (MLC). The SLC can store only one bit per memory element, whereas the MLC is capable of storing more than a single bit of information. For example, a triple level cell (TLC) is capable of storing three bits of data, a quadruple level cell (QLC) is capable of storing four bits of data, and a penta level cell (PLC) is capable of storing five bits of data. TLC, QLC, PLC, and other cells capable of storing more than a single bit of information are collectively referred to as MLC in this specification. The state of the memory cell can be programmed, and the state of the memory cell can be determined by comparing a read voltage of the memory cell against one or more read level thresholds.

QoS (quality of service) is a key evaluation factor for memory systems. QoS metrics can include, for example, latency/response time, system throughput, and other measurements. Different QoS latency metrics or numbers can be established for various applications. For example, mixed write and read (or mixed input and output (I/O)) workload environments can include, e.g., random write/read workloads, and sequential write/read workloads. In one example, a memory system can have a QoS target of 99.9% for a mixed workload having drive capacities of a 70% write/30% write/read ratio, a 4K page size, and a queue depth=1. In another example, a memory system can have a QoS target of 99.999% for a mixed workload having drive capacities of a 70% write/30% write/read ratio, a 4K page size, and a queue depth=32.

Each programming pass performed on the memory system takes a duration of time to complete (e.g., a program time). The long program time associated with memory systems and especially MLC memory systems where more than 2 bits of information is stored per memory element, can negatively impact achievement of the associated QoS target.

In a memory system operating with a mixed workload, if a read operation request is received while a previous program operation is in progress, the read operation is forced to wait until the program operation has been completed. Due to the longer program time associated with MLC memory systems where more than 2 bits of information is stored per memory element, the read operation is delayed during that longer program time, thereby having a negative impact on the QoS latency and throughput targets.

Particular implementations of the subject matter described in this disclosure can be implemented and help realize one or more of the following advantages. In some implementations, the QoS of the memory system and user experience (e.g., in terms of system response time) for read operations (or other operations that have higher execution priorities) can be improved, as an ongoing lower-execution-priority operation (e.g., program or write operation) can be preempted by a higher-execution-priority operation. For example, a data transfer interrupt mechanism can be introduced on both the memory controller and the memory device of the memory system such that the lower-execution-priority operation (e.g., the program operation) can be suspended earlier than other memory systems that do not implement the disclosed features to perform the higher-execution-priority operation (e.g., the read operation). Further, in some cases, unlike write suspend commands that can suspend an ongoing program operation only after data transfer from the controller to the memory device is complete, e.g., but before the data is actually stored in the memory device, the techniques described in this disclosure can suspend the ongoing program operation while the data is still being transferred from the memory controller, without having to wait until the memory device finishes receiving the complete data from the controller.

In some implementations, the described techniques allow a pre-check method to be implemented at the memory controller side to ensure that handling of the read operation will preempt the program data transfer process of the program operation. In some implementations, on the memory controller side, firmware does not need to involve any additional control action, and hardware can handle the pre-check or determination. The read handle can suspend data transfer automatically to decrease the latency.

On the memory device, a page-buffer dynamic switch method can be implemented to ensure that read and write operations can be mixed and handled properly. In some implementations, in the described techniques, a command-based preempt interaction mechanism is designed to avoid internal handling logical chaos on the memory device side. For example, with this feature, the memory device can automatically identify the type of operation and switch the read/program context, without breaking the internal state machine of the memory device.

In some implementations, the described techniques can reduce the stall of other memory operations, improve efficiency of handling the read command, and/or increase throughput of memory system because waiting until completion of the data transfer for an ongoing program operation can be avoided.

Figure 2:
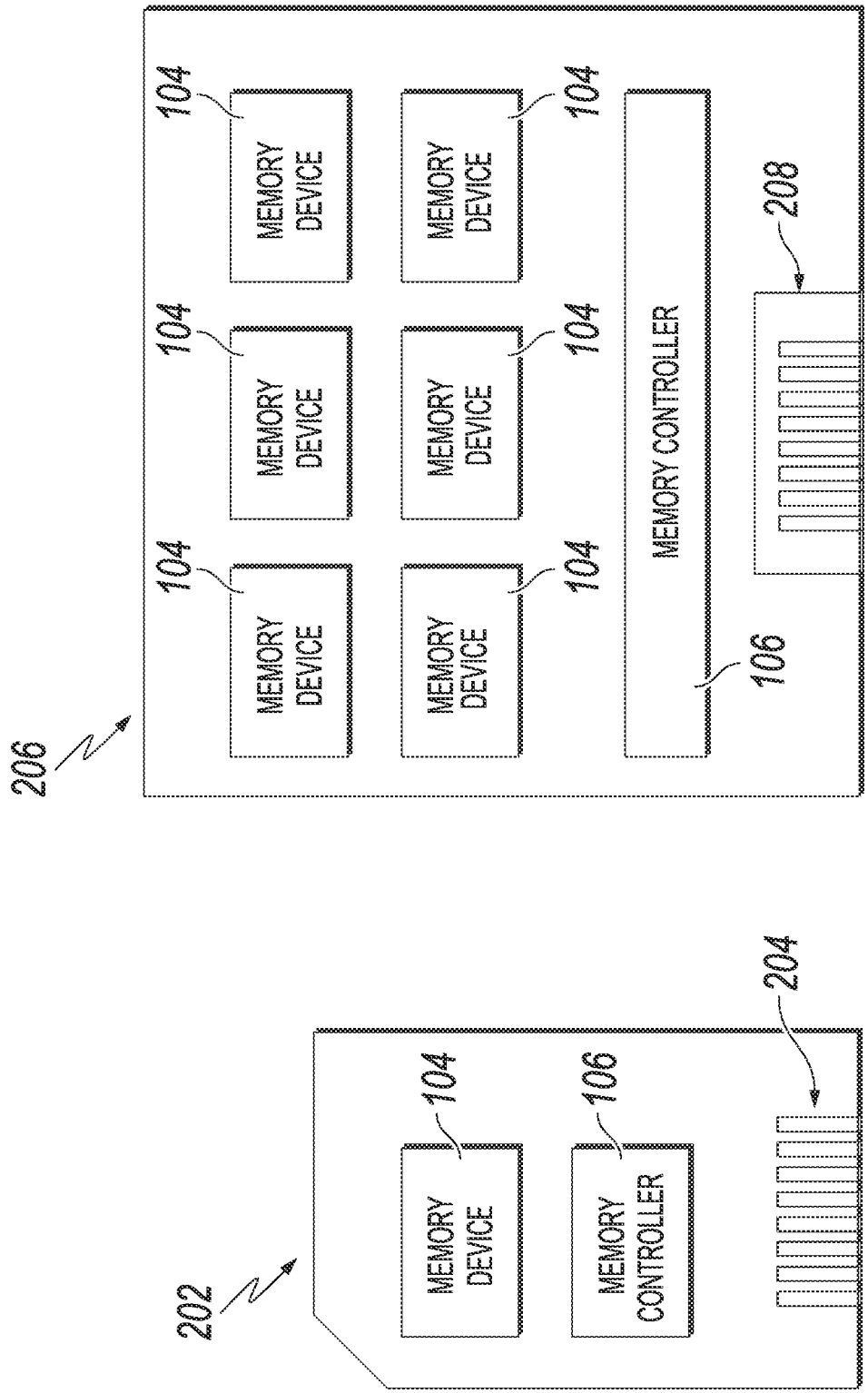
FIG. 2A shows a diagram of an example memory card, in accordance with one or more implementations of the present disclosure.
FIG. 2B shows a diagram of an example solid-state drive (SSD), in accordance with one or more implementations of the present disclosure.

FIG. 1 shows a block diagram of an example system 100, in accordance with some aspects of the present disclosure. System 100 can be a mobile phone, desktop computer, laptop computer, tablet computer, vehicle computer, game console, printer, positioning device, wearable electronic device, smart sensor, Virtual Reality (VR) device, Augmented Reality (AR) device, or any other suitable electronic device having storage therein. As shown in FIG. 1, system 100 can include a host 108 and a memory system 102. Memory system 102 includes one or more memory devices 104 and a memory controller 106. Host 108 can be, for example, a processor (e.g., a Central Processing Unit (CPU)) or a system on a chip (SoC) (e.g., an Application Processor (AP)) of an electronic device. Host 108 can be configured to send data to memory device 104 or receive data from memory device 104. To send data to memory device 104 or receive data from memory device 104, host 108 can send instructions to memory system 102 in addition to the data.

Memory device 104 can be any memory device disclosed in the present disclosure. As disclosed in detail below, memory device 104 (e.g., a NAND flash memory device) can support program operation suspension triggered by interrupts.

In some implementations, memory controller 106 is coupled to memory device 104 and host 108, and is configured to control memory device 104. Memory controller 106 can manage data stored in memory device 104 and communicate with host 108. In some implementations, memory controller 106 is designed for operation in a low duty cycle environment, such as a Secure Digital (SD) card, Compact Flash (CF) card, Universal Serial Bus (USB) flash drive, or other medium for use in electronic devices such as personal computers, digital cameras, mobile phones, and so forth. In some implementations, memory controller 106 is designed for operation in a high duty cycle environment SSD or embedded multimedia card (eMMC) that is used as a data store and enterprise storage array for mobile devices such as smart phones, tablet computers, laptop computers, and the like.

Memory controller 106 can be configured to control the operation (e.g., read, erase, and program (or write) operations) of memory device 104. For example, based on instructions received from host 108, memory controller 106 can transmit various commands (e.g., program (or write) commands, read commands, erase commands, etc.) to memory device 104 to control the operation of memory device 104. Consistent with the scope of the present disclosure, in some implementations, memory controller 106 transmits a program command to memory device 104 to initiate a program operation to be performed by memory device 104. During an ongoing program operation, an interrupt (e.g., a read operation to another page) may occur, for example, from host 108. Memory controller 106 may be configured to transmit an interrupt command to memory device 104 to suspend the program operation. In some implementations, upon completion of other operations triggered by the interrupt, memory controller 106 also can be configured to transmit a resume command to memory device 104 to resume and complete the suspended program operation.

Memory controller 106 can also be configured to manage various functions with respect to data stored or to be stored in memory devices 104, including but not limited to bad block management, garbage collection, logical to physical address translation, wear leveling, and the like. In some implementations, memory controller 106 is also configured to process Error Correction Codes (ECC) with respect to data read from memory device 104 or written to the memory device 104. Memory controller 106 can also perform any other suitable functions, such as formatting memory device 104. The memory controller 106 can communicate with external devices (e.g., host 108) according to a particular communication protocol. For example, the memory controller 106 can communicate with the external device via at least one of various interface protocols, such as a USB protocol, an MMC protocol, a Peripheral Component Interconnect (PCI) protocol, a PCI express (PCI-E) protocol, an Advanced Technology Attachment (ATA) protocol, a serial ATA protocol, a parallel ATA protocol, a small computer system small interface (SCSI) protocol, an Enhanced Small Disk Interface (ESDI) protocol, an Integrated Drive Electronics (IDE) protocol, a Firewire protocol, and so forth.

Memory controller 106 and the one or more memory devices 104 can be integrated into various types of storage devices and can be included, for example, in the same package (e.g., a Universal Flash Storage (UFS) package or an eMMC package). That is, memory system 102 can be implemented and packaged into different types of end electronic products. In one example as shown in FIG. 2A, memory controller 106 and the single memory device 104 can be integrated into a memory card 202. Memory card 202 can include a PC card (PCMCIA), a CF card, a Smart Media (SM) card, a memory stick, a multimedia card (MMC, RS-MMC, MMCmicro), an SD card (SD, miniSD, microSD, SDHC), a UFS, and the like. Memory card 202 can also include a memory card connector 204 configured to couple memory card 202 to a host (e.g., host 108 in FIG. 1). In another example as shown in FIG. 2B, memory controller 106 and multiple memory devices 104 can be integrated into the SSD 206. SSD 206 can also include an SSD connector 208 configured to couple SSD 206 to a host (e.g., host 108 in FIG. 1). In some implementations, the storage capacity and/or operating speed of SSD 206 is greater than the respective storage capacity and/or operating speed of memory card 202.

Figure 3:
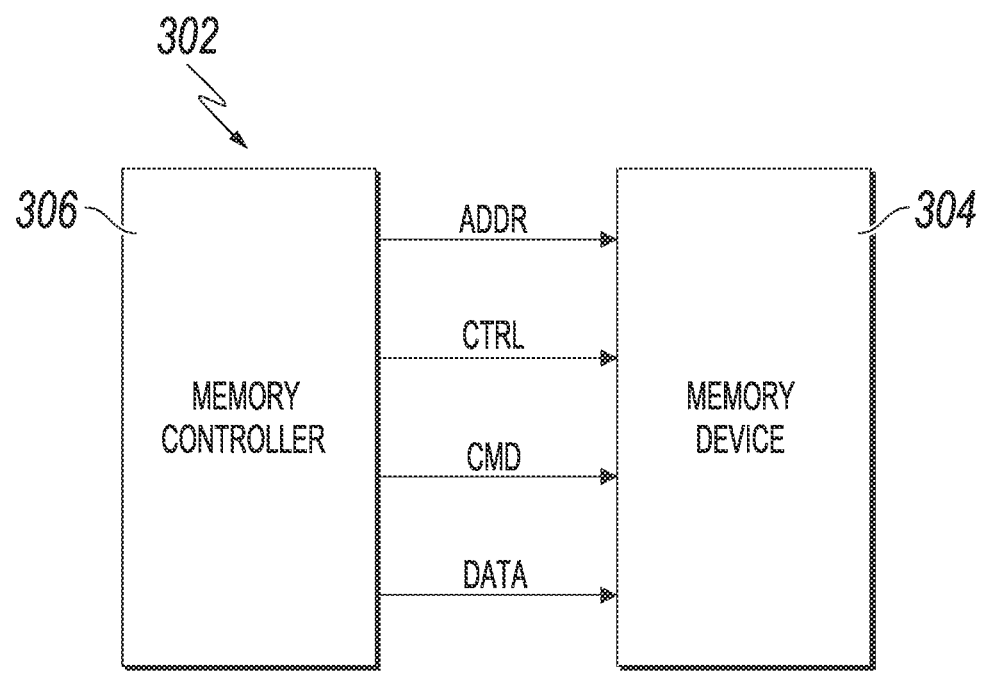
FIG. 3 shows a block diagram of an example memory system, in accordance with one or more implementations of the present disclosure.

FIG. 3 shows a block diagram of an example memory system 302, in accordance with some aspects of the present disclosure. As illustrated, memory system 302 includes a memory controller 306 and a memory device 304. The memory controller 306 and memory device 304 can respectively be example implementations of the memory controller 106 and the memory device 104 discussed in connection with FIG. 1 and FIGS. 2A and 2B.

The memory controller 306 can exchange data with the memory device 304, for example, in response to a request from a host (e.g., host 108 in FIG. 1). As an example, the memory controller 306 can read data from the memory device 304 in response to a request from the host and can provide the read data to the host. As another example, the memory controller 306 can write or program data in the memory device 304 in response to a program request from the host.

In some implementations, to perform the above-described operations, the memory controller 306 can provide signals, such as an address (ADDR), a command (CMD), and a control signal (CTRL), to the memory device 304 and can exchange data (DATA) with the memory device 304. The memory device 304 can output data or can program received data in response to the signals received from the memory controller 306.

The memory controller 306 can provide the memory device 304 with a read command, a program command, an erase command, or the like as the command. For example, the memory controller 306 can request a program operation of a word line unit of the memory device 304 through the program command. The memory controller 306 can transmit one or more addresses representing one or more word lines on which the program operation is performed such that programming is performed on memory cells on the one or more word lines of a memory block of the memory device 304 indicated by the one or more addresses ADDR. As another example, the memory controller 306 can request a read operation to read data stored in memory cells on one or more word lines of the memory device 304 through the read command. As another example, the memory controller 306 can request an erase operation to erase data programed in memory cells of one or more memory blocks or sub block units of the memory device 304 through the erase command.

Figure 4:
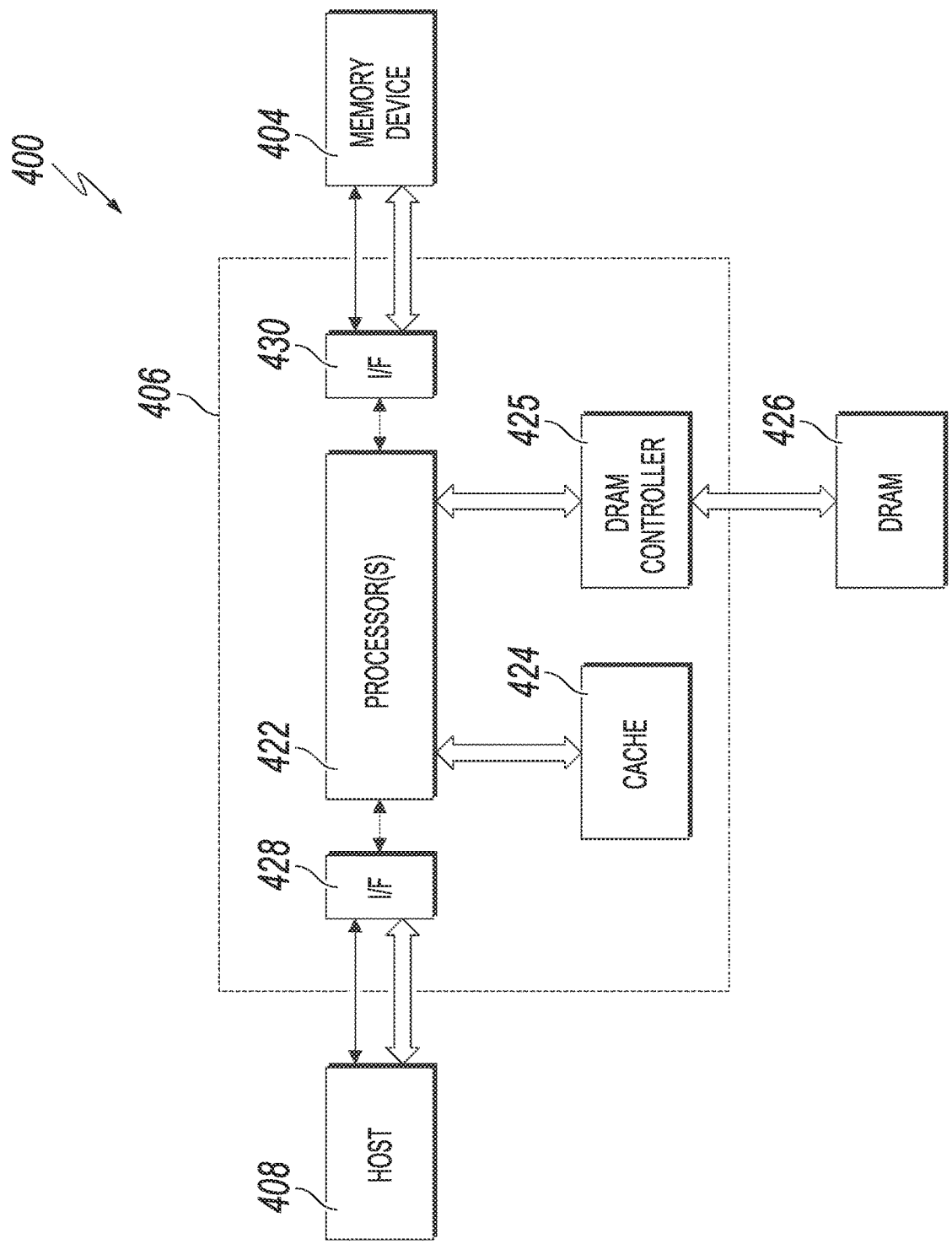
FIG. 4 shows a block diagram of an example memory system, in accordance with one or more implementations of the present disclosure.

FIG. 4 shows a block diagram of an example memory system 400, in accordance with some aspects of the present disclosure. Memory system 400 includes host 408, memory controller 406, memory device 404, and DRAM 426. Memory controller 406 includes one or more processors 422, and one or more memories including one or more of a cache 424 and/or another type of data store. FIG. 4 shows a Dynamic Random Access Memory (DRAM) 426 as being independent from the memory controller 406, however, in some other implementations, the DRAM 426 can be included as part of the memories included in the memory controller 406. In some implementations, the memory controller 406 can include a DRAM controller 425 for the DRAM 426. The memory controller 406 can also include an interface (I/F) 428 (also referred to as a "front-end interface") to a host 408 and an interface (I/F) 430 (also referred to as a "back-end interface") to a memory device 404. In some implementations, the interface 428 can receive instructions and data from the host 408 and forward the instructions and data to the processors 422 and the DRAM 426, respectively. In some implementations, the interface 430 can transfer control signals and data from the processors 422 and the DRAM 426, respectively, to the memory device 404.

In some implementations, the processors 422 can include an Arithmetic Logic Unit (ALU) configured to perform arithmetic and/or logical operations. The memory device 404, the one or more memories of the memory controller 406 such as the cache 424, or a combination of these can store programming instructions which, when loaded into the processors 422, can be executed by the processors 422 to perform various functions of the memory controller 406, such as the functions described in this disclosure. As an example, the memory controller 406 is configured to perform functions such as repeatedly checking whether a second command is received from the host 408 while performing data transfer to the memory device 404 for a first operation corresponding to a first command, and sending a suspend command to the memory device 404 whenever the second command is received, provided that the data transfer in a current allocation unit is completed.

Figure 5:
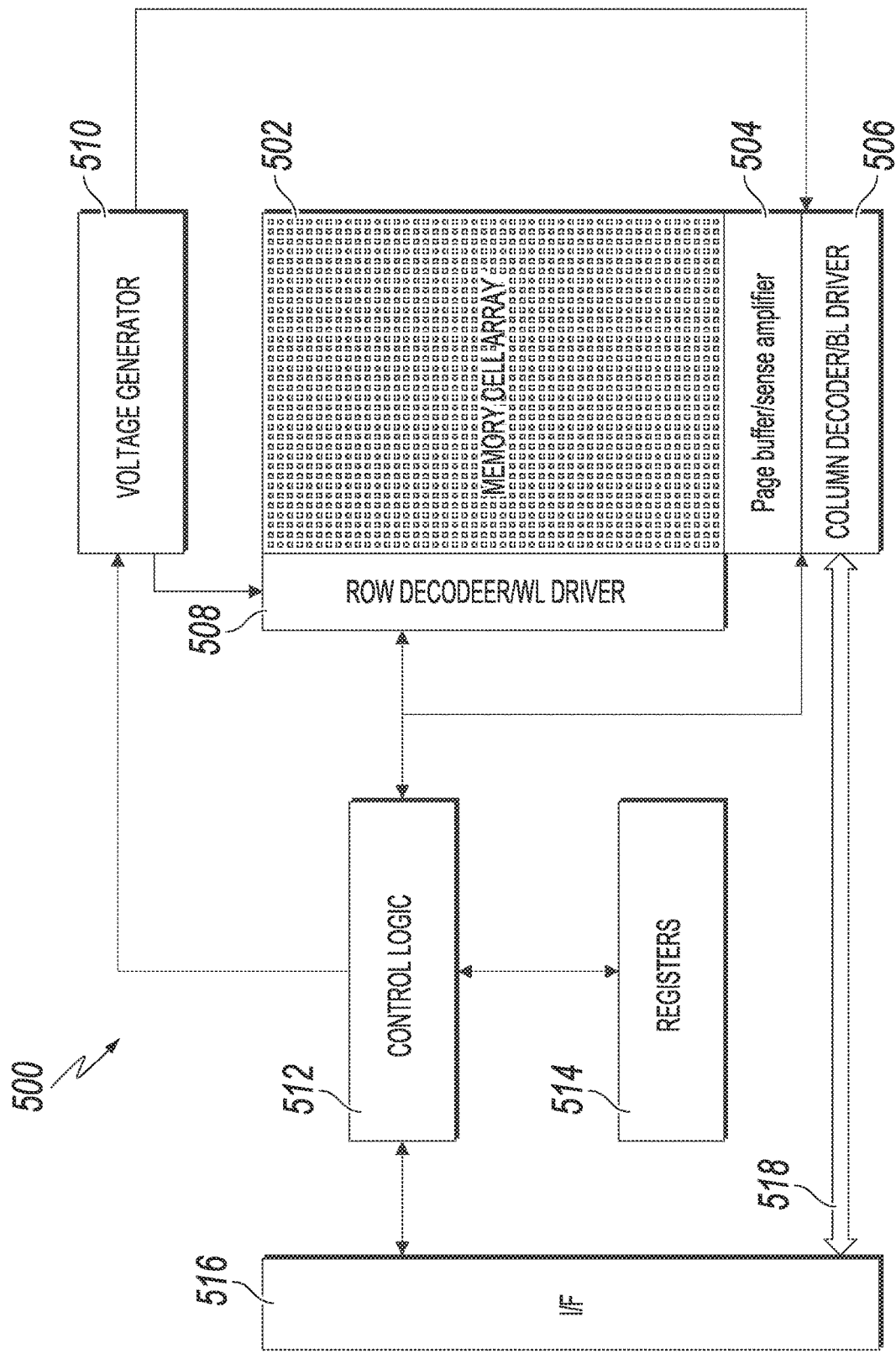
FIG. 5 shows a block diagram of an example memory device, in accordance with one or more implementations of the present disclosure.

FIG. 5 shows a block diagram of an example memory device 500, in accordance with some aspects of the present disclosure. The memory device 500 can be an example embodiment of the memory device 104 or 304 discussed in connection with FIG. 1, FIGS. 2A and 2B, and FIG. 3. As shown, memory device 500 includes a memory cell array 502, a page buffer/sense amplifier 504, a column decoder/bit line driver 506, a row decoder/word line driver 508, a voltage generator 510, control logic 512, registers 514, an interface 516, and a data bus 518. It is understood that in some examples, additional circuits not shown in FIG. 5 may be included as well.

Figure 6:
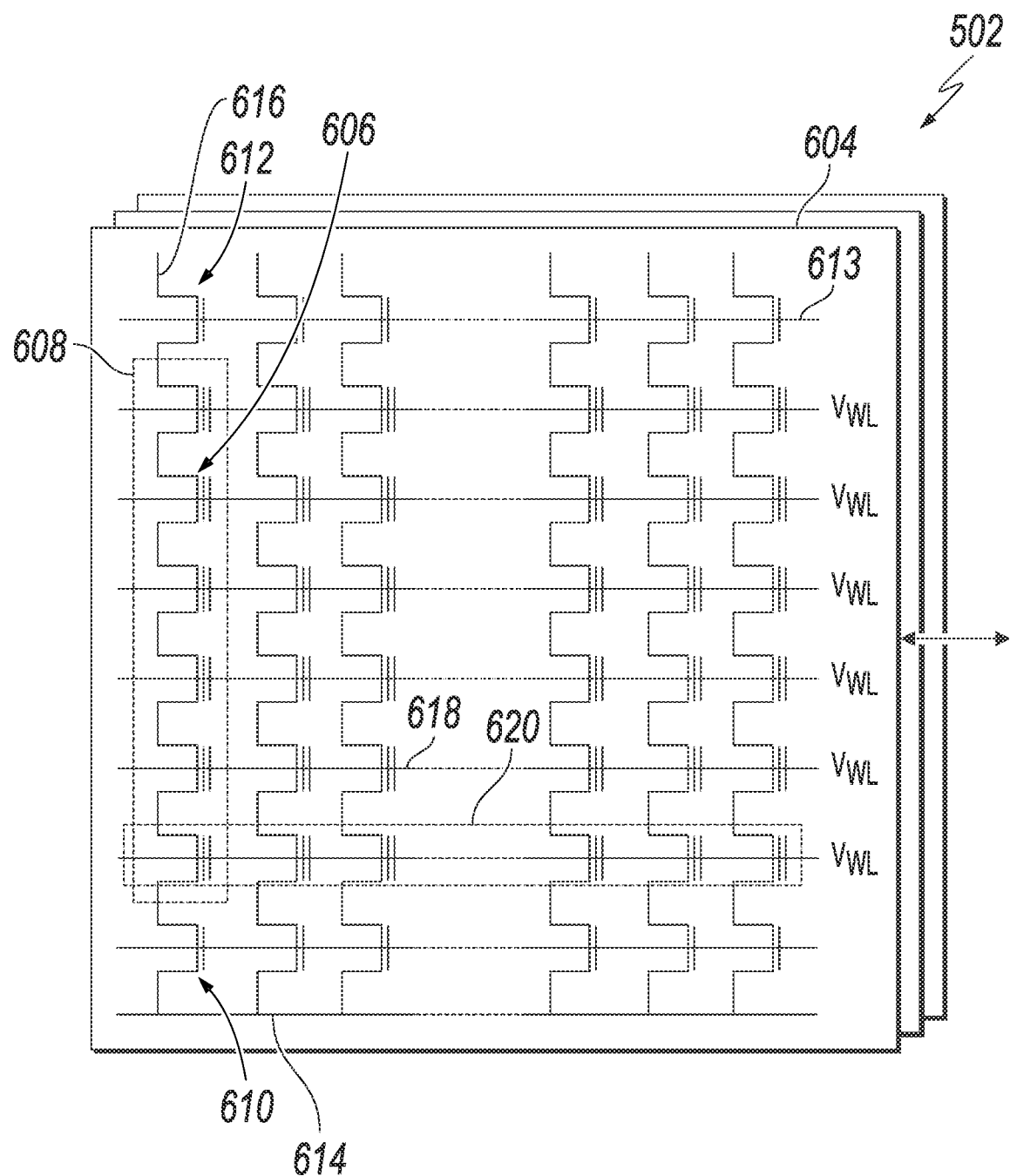
FIG. 6 shows a schematic diagram of an example memory cell array in a memory device, in accordance with one or more implementations of the present disclosure.

Memory cell array 502 can be a NAND Flash memory cell array in which memory cells are provided in the form of an array of NAND memory strings each extending vertically above a substrate (not shown). Referring to FIG. 6, in some implementations, each NAND memory string 608 includes a plurality of memory cells 606 coupled in series and stacked vertically. Each memory cell 606 can hold a continuous, analog value, such as an electrical voltage or charge that depends on the number of electrons trapped within a region of memory cell 606. Each memory cell 606 can be either a floating gate type of memory cell including a floating-gate transistor or a charge trap type of memory cell including a charge-trap transistor.

In some implementations, each memory cell 606 is a single level cell (SLC) that has two possible memory states (levels) and thus, can store one bit of data. For example, the first memory state "0" can correspond to a first range of threshold voltages, and the second memory state "1" can correspond to a second range of threshold voltages. In some implementations, each memory cell 606 is an xLC that is capable of storing more than a single bit of data in more than four memory states (levels). For example, the xLC may store two bits per cell (MLC), three bits per cell (TLC), or four bits per cell (QLC)). Each xLC can be programmed to assume a range of possible nominal storage values (i.e., 2N pieces of N-bits data, e.g., gray codes). In one example, the MLC can be programmed to assume one of three possible programming levels from an erased state by writing one of three possible nominal storage values to the cell. A fourth nominal storage value can be used for the erased state.

Each NAND memory string 608 can also include a source select gate (SSG) transistor 610 at its source end and a drain select gate (DSG) transistor 612 at its drain end. SSG transistor 610 and DSG transistor 612 can be configured to activate select NAND memory strings 608 (columns of the array) during read and program operations. In some implementations, the sources of NAND memory strings 608 in the same block 604 are coupled through a same source line (SL) 614, e.g., a common SL. In other words, all NAND memory strings 308 in the same block 604 have an array common source (ACS), according to some implementations. The drain of each NAND memory string 608 is coupled to a respective bit line 616 from which data can be read or written via an output bus (not shown), according to some implementations. In some implementations, each NAND memory string 608 is configured to be selected or deselected by applying a select voltage or a deselect voltage to the gate of respective DSG transistor 612 through one or more DSG lines 613 and/or by applying a select voltage or a deselect voltage to the gate of respective SSG transistor 610 through one or more SSG lines 615.

NAND memory strings 608 can be organized into multiple blocks 604, each of which can have a common source line 614, e.g., coupled to the ACS. In some implementations, each block 604 is the basic data unit for erase operations, i.e., all memory cells 606 on the same block 604 are erased at the same time. To erase memory cells 606 in a select block 604, source lines 614 coupled to select block 604 as well as unselect blocks 604 in the same plane as select block 604 can be biased with an erase voltage (Vers), such as a high positive bias voltage (e.g., 20 V or more). Memory cells 606 of adjacent NAND memory strings 608 can be coupled through word lines 618 that select which row of memory cells 606 is affected by read and program operations. In some implementations, each word line 618 is coupled to a one or more pages of memory cells 606, which is the basic data unit for read and program operations. The size of one or more pages in bits can relate to the number of NAND memory strings 608 coupled by word line 618 in one block 604. Each word line 618 can include a plurality of control gates (gate electrodes) at each memory cell 606 and a gate line coupling the control gates.

Memory cell array 502 can include an array of memory cells 606 in a plurality of rows and a plurality of columns in each block 604. One row of memory cells 606 corresponds to one or more pages, and one column of memory cells corresponds to one NAND memory string 608, according to some implementations. The plurality of rows of memory cells 606 can be respectively coupled to word lines 618, and the plurality of columns of memory cells 606 can be respectively coupled to bit lines 616.

Referring back to FIG. 5, page buffer/sense amplifier 504 can be configured to read and program (write) data from and to memory cell array 502 according to the control signals from control logic 512. In one example, page buffer/sense amplifier 504 may store one or more pages of program data to be programmed into memory cell array 502. In another example, page buffer/sense amplifier 504 may verify programmed select memory cells 606 in each program/verify loop (cycle) in a program operation to ensure that the data has been properly programmed into memory cells 606 coupled to select word lines 618. In still another example, page buffer/sense amplifier 504 may also sense the low power signals from bit line 616 that represents a data bit stored in memory cell 606 and amplify the small voltage swing to recognizable logic levels in a read operation. As described below in detail and consistent with the scope of the present disclosure, in program operations, page buffer/sense amplifier 504 can include a plurality of page buffer circuits respectively coupled to bit lines 616, and each including a set of storage units (e.g., latches) for temporarily storing a piece of N-bits data (e.g., in the form of gray codes) received from data bus 518 and providing the piece of N-bits data to a corresponding select memory cell 606 through the corresponding bit line 616 in a program operation using a multi-cache loading scheme.

Column decoder/bit line driver 506 can be configured to be controlled by control logic 512 and select one or more NAND memory strings 608 by applying bit line voltages generated from voltage generator 510. Row decoder/word line driver 508 can be configured to be controlled by control logic 512 and select/deselect blocks of memory cell array 502 and select/deselect word lines 618 of the blocks 604. Row decoder/word line driver 508 can be further configured to drive word lines 618 using word line voltages generated from voltage generator 510. Voltage generator 510 can be configured to be controlled by control logic 512 and generate the word line voltages (e.g., read voltage, program voltage, channel pass voltage, local voltage, verify voltage, etc.), bit line voltages, and source line voltages to be supplied to memory cell array 502.

Control logic 512 can be coupled to each circuit described above and configured to control the operations of each circuit. Registers 514 can be coupled to control logic 512 and include status registers, command registers, and address registers for storing status information, command operation codes (OP codes), and command addresses for controlling the operations of each peripheral circuit. Interface 516 can be coupled to control logic 512 and act as a control buffer to buffer and relay control commands received from a memory controller (e.g., 106 in FIG. 1) and/or a host (e.g., 108 in FIG. 1) to control logic 512 and status information received from control logic 512 to the memory controller and/or the host. Interface 516 can also be coupled to column decoder/bit line driver 506 via data bus 518 and act as a data input/output (I/O) interface and a data buffer to buffer and relay the data to and from memory cell array 502.

Figure 7:
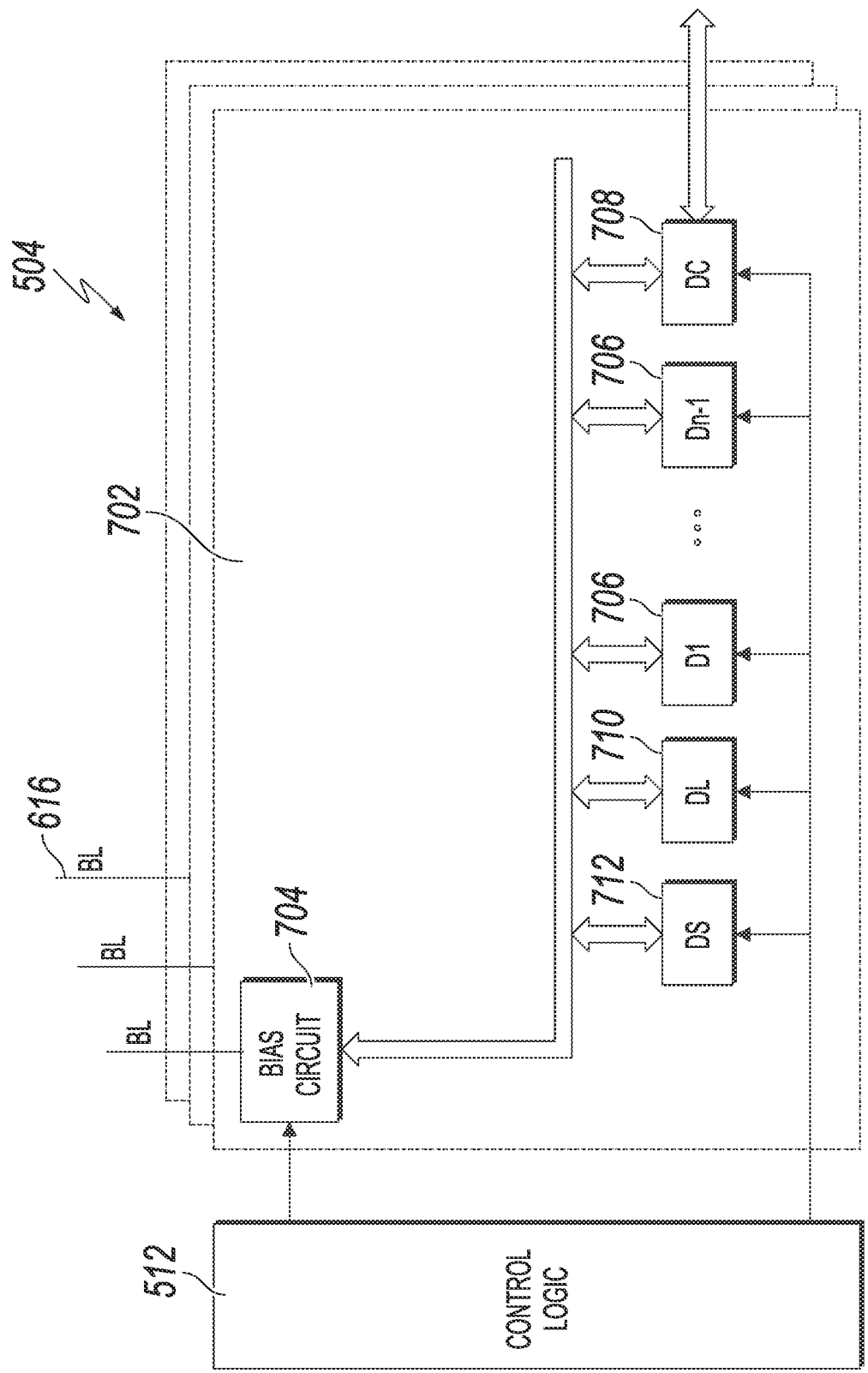
FIG. 7 shows a block diagram of an example page buffer of a memory device, in accordance with one or more implementations of the present disclosure.

FIG. 7 shows a block diagram of an example page buffer/sense amplifier 504, according to some aspects of the present disclosure. In some implementations, page buffer/sense amplifier 504 includes a plurality of page buffer circuits 702 each coupled to a respective one of bit lines 616. In other words, each page buffer circuit 702 can be coupled to a respective column of memory cells 606 (e.g., NAND memory string 608) through a corresponding bit line 616.

In some implementations, to implement the multi-cache data loading scheme for sequential program operations, each page buffer circuit 702 can include a set of data storage units 706 and a cache storage unit 708. In some implementations, page buffer circuit 702 can include additional storage units other than data storage units 706 and cache storage unit 708. The additional storage units, data storage units 706, and cache storage unit 708 can be used together to store the current data.

Each page buffer circuit 702 can include a plurality of storage units for storing non-data page information, i.e., any information other than the data bits in the data to be programmed into the memory cell array. As shown in FIG. 7, in some implementations, page buffer circuit 702 includes a sensing/program storage unit 712 configured to store information indicative of whether the current operation performed by page buffer/sense amplifier 504 is a read operation or a program operation, as well as a 3BL storage unit (DL) 710 configured to store the bias information of the respective bit line 616 coupled to page buffer circuit 702. As shown in FIG. 7, each page buffer circuit 702 can further include a bias circuit 704 coupled to a respective bit line 616 and configured to apply a bit line voltage to corresponding select memory cell 606 coupled to a respective bit line 616 in the program operation. Depending on whether the corresponding select memory cell 606 passes the verification at the respective level according to the N-bits of data for programming the select memory cell 606, for example, a high voltage level and a low voltage level, can be used as the bit line voltage to bias the respective bit line 616. In some implementations, to optimize the threshold voltage distributions, for example, enlarging the read margins between adjacent levels and reducing the width of each level, a medium voltage level is used as well for biasing the bit line voltage. That is, three voltage levels, e.g., high, medium, and low, can be applied to the respective bit line 616 (referred to herein as 3BL). In some implementations, a voltage level applied to the respective bit line 616 (e.g., 3BL bias) is the non-data page information stored in 3BL storage unit 710.

Figure 8:
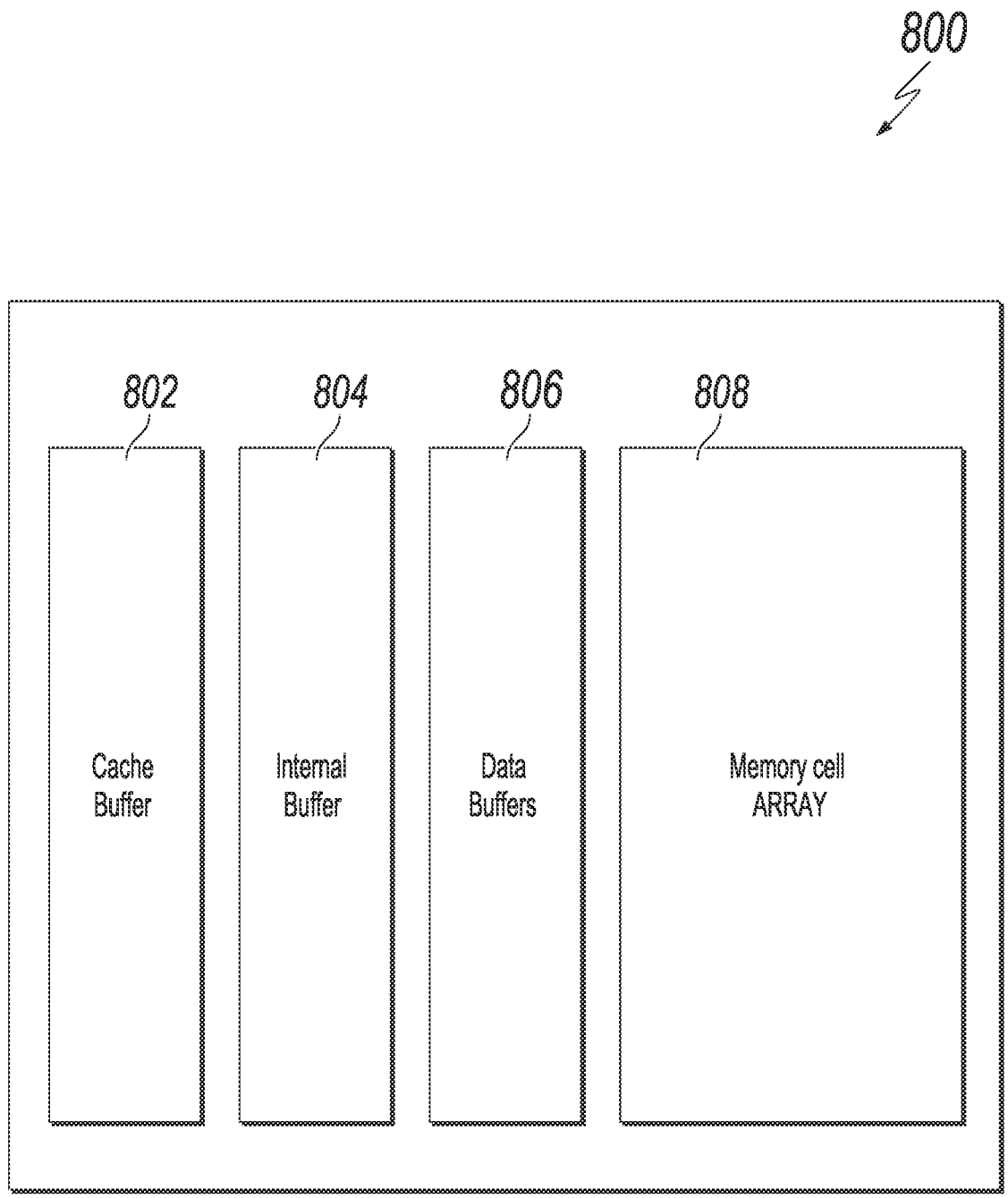
FIG. 8 shows a block diagram of an example memory device, in accordance with one or more implementations of the present disclosure.

FIG. 8 shows a block diagram of an example memory device 800, in accordance with some aspects of the present disclosure. Memory device 800 can be an example of the memory device 104, 304, or 500. As shown, memory device 800 includes a cache buffer 802, an internal buffer 804, a data buffer 806, and a memory cell array 808. It is understood that in some examples, additional circuits not shown in FIG. 8 may be included as well. In some implementations, cache buffer 802, internal buffer 804, data buffer 806 can be examples of cache storage unit 708, storage unit 710, and data storage units 706, respectively.

In some implementations, cache buffer 802 operates as a cache memory of the memory device 800 for rapid data access. For example, cache buffer 802 can temporarily store data received from the memory controller or host or can temporarily store metadata (e.g., mapping tables) of the memory cell array 808.

In some implementations, internal buffer 804 operates as an additional storage space of the memory device 800. For example, internal buffer 804 can temporarily store data received from cache buffer 802 and forward the data to data buffer 806 during a program operation. In some examples, internal buffer 804 can temporarily store data received from data buffer 806 and forward the data to cache buffer 802 during a read operation. In some examples, memory device 800 can move data from cache buffer 802 to data buffer 806, or vice versa, without using internal buffer 804.

In some implementations, data buffer 806 includes multiple buffer units (or page registers). In some implementations, data buffer 806 is connected to memory cell array 808 through bit lines. In some implementations, the data buffer 806 is connected to cache buffer 802 through multiple data lines. Data buffer 806 can store data to be programmed in memory cells of the memory cell array 808 or data read from the memory cells. During an example program operation, data buffer 806 can receive data to be programmed in memory cells from cache buffer 802, and store the received data. During an example read operation, data buffer 808 can temporarily store data read from the memory cell array 808, and output the data to cache buffer 802. In some implementations, data buffer 806 can include a column selection circuit, and the like, in addition to the page buffers.

Figure 9:
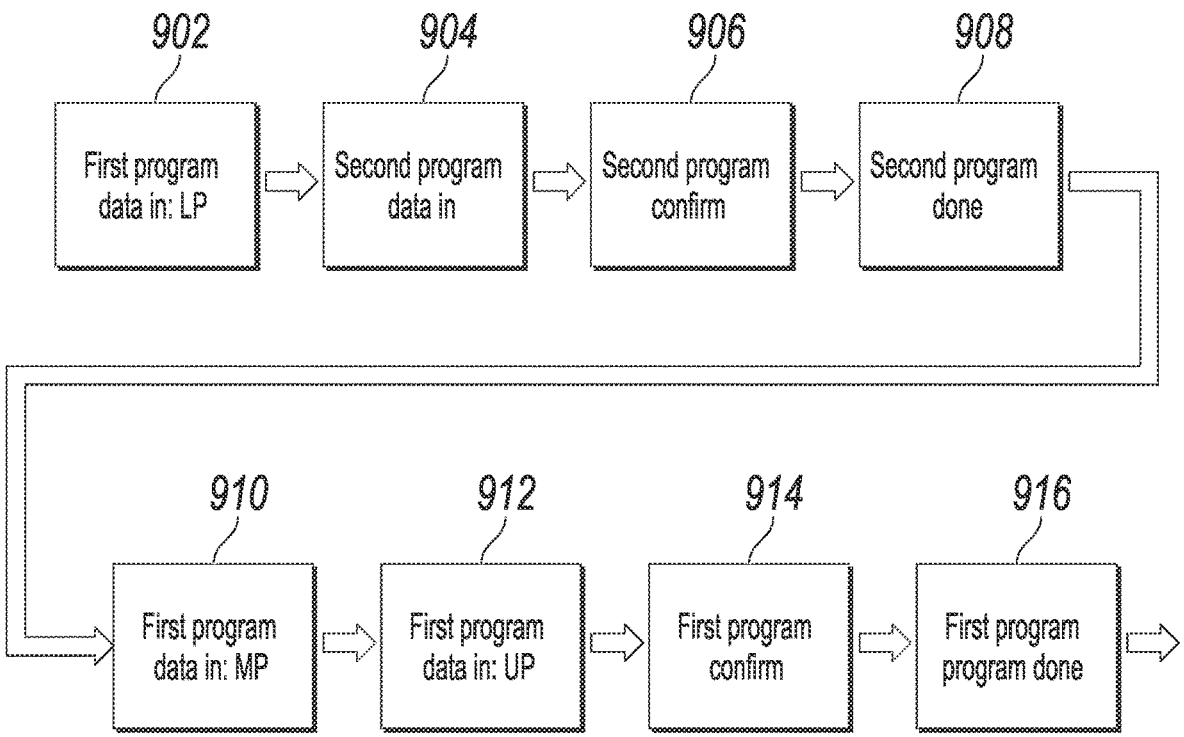
FIG. 9 shows a flow chart of an example process of managing operations by a memory system, in accordance with one or more implementations of the present disclosure.

FIG. 9 shows a flow chart of an example process 900 of managing operations associated with a memory system, in accordance with some aspects of the present disclosure. Example process 900 can be performed by any suitable device disclosed herein, such as memory system 100, 202, 206, 302, or 400, etc. Example process 900 will be described as being performed by a memory system having a memory controller and a memory device, programmed appropriately in accordance with this disclosure. The memory controller can be any suitable device disclosed herein, such as memory controller 106, 306, or 406, etc. The memory device can be any suitable device as disclosed herein, such as memory device 104, 304, 404, 500, 800, etc. In some implementations, some or all of the operations in example process 900 can be implemented based on the techniques described in connection with FIGS. 1-8. The operations shown in process 900 may not be exhaustive and that other operations can be performed as well before, after, or between any of the illustrated operations. Further, some of the operations may be performed simultaneously, or in a different order than shown in FIG. 9.

Figure 10:
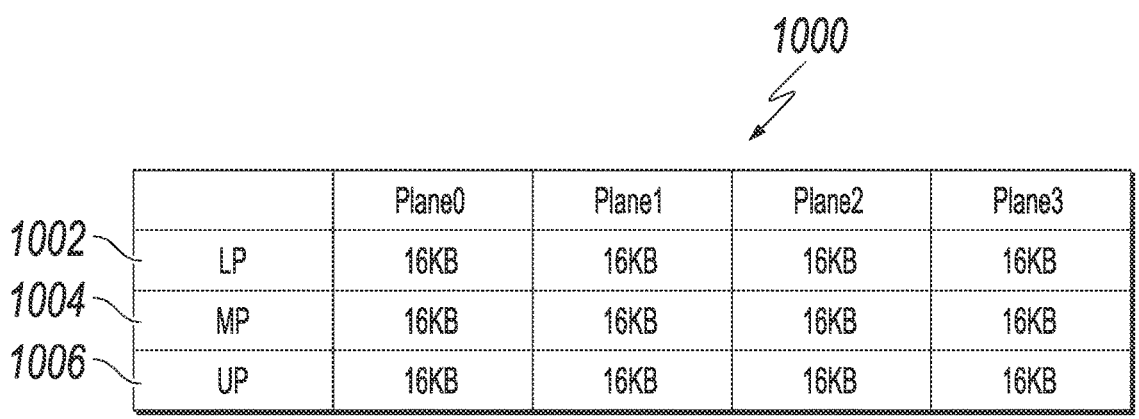
FIG. 10 shows an example data structure used in a memory system, in accordance with one or more implementations of the present disclosure.

In the shown example, the memory device receives a first command from the memory controller. In some implementations, the first command instructs the memory device to perform a first operation to program first data into the memory cell array of the memory device. For example, the first command can be a TLC program command or a QLC program command. The first operation indicated by the first command includes the memory controller transmitting or transferring the first data to the memory device. In some implementations, the memory controller performs the data transfer to the memory device in terms of allocation units (AUs). That is, to transfer the first data to the memory device, the memory controller partitions the first data into a sequence of multiple AUs and sends the AUs one by one in an order according to the sequence of AUs. An AU is a basic unit or the smallest amount of data that can be separately retrieved from or written to the memory system. In some implementations, AUs are of an equal size in the memory system. In some other implementations, the sizes of AUs can vary within the memory system, or vary from one memory system to another memory system. Referring to FIG. 10, example data 1000 that can be transferred by the memory controller as the first data includes three AUs, where the three AUs are represented by lower page (LP) 1002, middle page (MP) 1004, and upper page (UP) 1006.

Referring back to FIG. 9, after receiving the first command, the memory controller transfers the first AU, e.g., LP 1002, of the first data to the memory device (902). In some implementations, upon receiving the first AU, the memory device can store the first AU in a cache buffer, e.g., cache buffer 802, of the memory device.

The program operation (including the data transfer from the memory controller to the memory device) takes a duration of time to complete. In general, different operations can have different characteristics such as execution priorities and can take or be associated with different durations of time to complete. To improve the overall execution efficiency or response time of the memory system, one program operation that has a higher execution priority than another program operation may preempt or interrupt the execution of the another program operation, even though the another program operation might have already been in execution or a command of the program operation that has a higher execution priority is received after a command of the another program operation that has a lower execution priority.

During execution of the program operation, the memory system checks, for example, in a repeated manner, whether another command that relates to the memory system is received while performing the data transfer to the memory device for the operation of the program command.

In some cases, if no other command is received, the memory controller continues to transfer the current AU, or proceeds to transfer the next AU in the sequence to the memory device.

Prior to sending the second AU, e.g., MP 1004, of the first data to the memory device, the memory controller receives a second command to program second data into the memory device (904). In the illustrated example, the second command has a higher execution priority than the first command. While FIG. 9 illustrates the second command as a program command, more generally, the second command can be any command that requests an operation having a higher execution priority than the program operation of the first command. In some implementations, the execution priorities of different operations can be determined based on durations of time to complete the different operations. For example, an operation requiring a shorter duration of time to complete can have a higher execution priority. In some implementations, the second command can involve an operation that takes a shorter duration of time to complete than the program operation of the first command. In one example, the second command can involve a program operation to write a smaller amount of data into the memory device that will take a shorter duration of time to complete than the first command to write a larger amount of data into the memory device. In another example, the second command can involve a read operation that will take a shorter duration of time to complete than the first command. In some other implementations, the execution priorities of different operations can be determined, or otherwise based on, the importance of the operations, or other factors or preferences.

In the example illustrated in FIG. 9, in response to receiving or detecting the second command that has a higher execution priority than the first command, a data transfer suspend command may be issued to suspend the ongoing data transfer process for the program operation of the first command. In some cases, the data transfer suspend command is issued as soon as the second command is detected to limit a delay in servicing the second command. In some implementations, the memory controller can send the data transfer suspend immediately after the transfer of a current AU is completed, and before the transfer of the subsequent AU begins. In some implementations, if the transfer of the current AU is not completed yet, the memory controller can wait for the transfer of the current AU to finish and then proceed to handle handover to perform operations related to the second command.

In response to receiving the data transfer suspend command, the memory device can suspend the operations of the first command, and start to process the second command. In some examples, the memory device moves the first AU of the first data from the cache buffer to an internal buffer, e.g., internal buffer 804, of the memory device, and stores the second data of the second command in the cache buffer of the memory device. Then, the memory device moves the second data from the cache buffer to a data buffer, e.g., data buffer 806, of the memory device, and confirms that all data of the second command is ready to be programmed into the memory cell array (906). After confirming all data of the second command are stored in the data buffer, the memory device programs the data of the second command into the memory cell array (908).

In some examples, before receiving the second command, the memory device may have moved the first AU of the first data from the cache buffer to the data buffer of the memory device. In these examples, after receiving the second command, the memory device moves the first AU of the first data from the data buffer to the internal buffer of the memory device.

In some implementations, after the operation of the second command is completed, a resume-last-operation command is issued. The resume-last-operation command resumes the previously suspended operation of the memory device, and more specifically resumes the data transfer process to enable continuation of the data transfer of the previously suspended program operation. In some implementations, the data transfer process can be resumed from a next AU, e.g., MP 1004, in the sequence of AUs at which the data transfer process had been suspended so that the transfer from the memory controller of the to-be-programmed data to the memory device can be completed. In some implementations, upon receiving the resume-last-operation command, the memory device moves the first AU of the first data of the first command from the internal buffer to the data buffer of the memory device.

After the operation of the second command is completed, the memory device resumes the program operation of the first command and stores the second AU, e.g., MP 1004, of the first data in the cache buffer of the memory device (910). In some implementations, absent receiving another command that has a higher execution priority than the first command, the memory device moves the second AU of the first data from the cache buffer to the data buffer of the memory without using the internal buffer.

The memory device continues to receive and store the third AU, e.g., UP 1006, of the first data in the cache buffer of the memory device (912). In some implementations, absent receiving another command that has a higher execution priority than the first command, the memory device moves the third AU of the first data from the cache buffer to the data buffer of the memory device without using the internal buffer.

After receiving all AUs of the first data, the memory device confirms that the first data is ready to be programmed into the memory device (914), and programs the first data into the memory cell array of the memory device (916).

Figure 11:
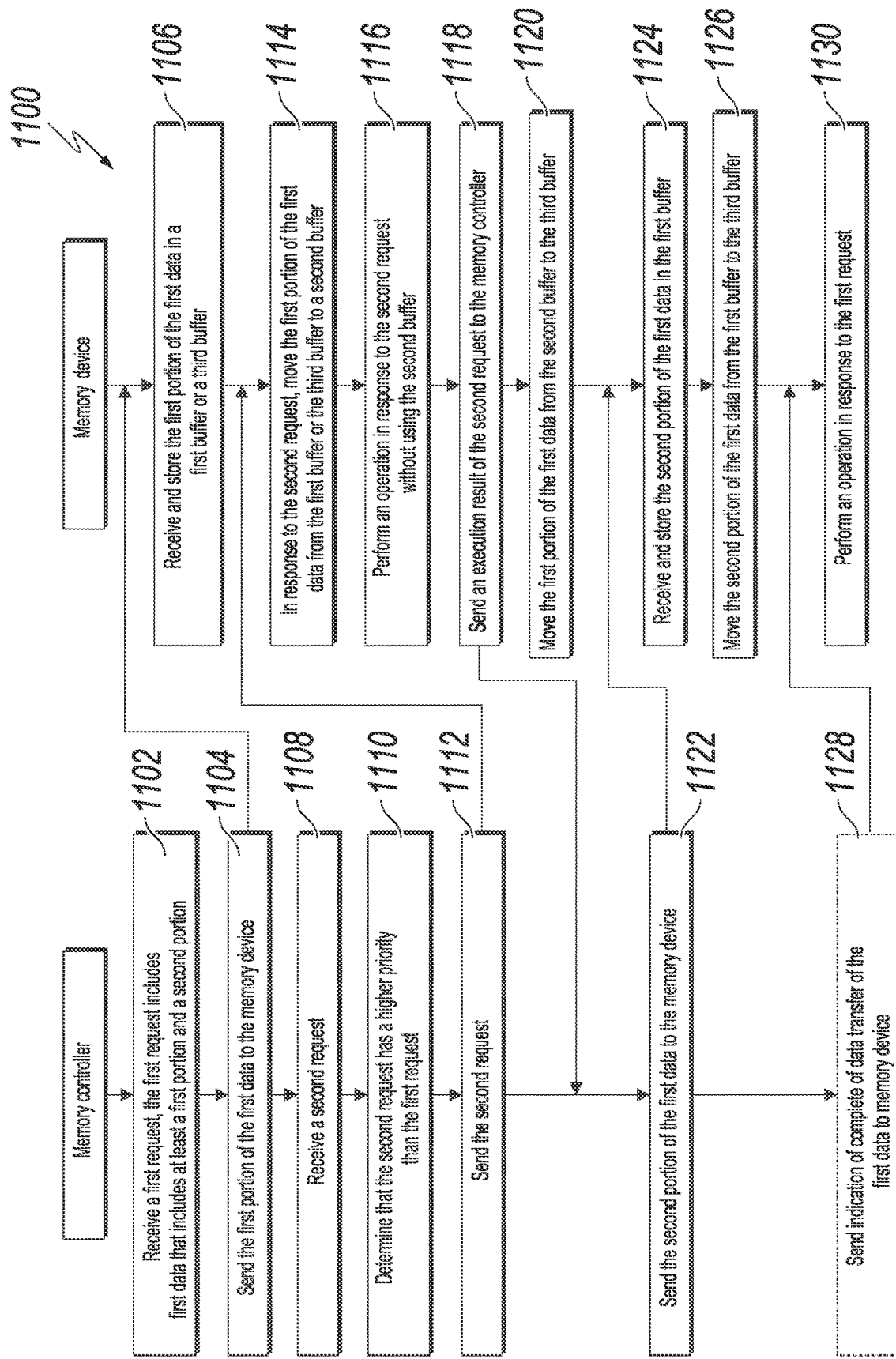
FIG. 11 shows a swimlane diagram of an example process performed by a memory system including a memory controller and a memory device, in accordance with one or more implementations of the present disclosure.

FIG. 11 shows a swimlane diagram of an example process 1100 for managing operations in a memory system, in accordance with some aspects of the present disclosure. Example process 1100 can be performed by any suitable device disclosed herein, such as memory system 100, 202, 206, 302, or 400, etc. Example process 1100 will be described as being performed by a memory system having a memory controller and a memory device, programmed appropriately in accordance with this disclosure. The memory controller can be any suitable device disclosed herein, such as memory controller 106, 306, or 406, etc. The memory device can be any suitable device as disclosed herein, such as memory device 104, 304, 404, 500, 800, etc. In some implementations, some or all of the operations in the example process 1100 can be implemented based on the techniques described in connection with FIGS. 1-10. The operations shown in process 1100 may not be exhaustive and other operations can be performed as well before, after, or between any of the illustrated operations. Further, some of the operations may be performed simultaneously, or in a different order than shown in FIG. 11.

As shown in FIG. 11, the memory controller receives a first request (1102). In some implementations, the memory controller receives the first request from a host. The first request can be a request to perform a first operation by the memory device. The first operation can be, for example, a program operation, an erase operation, or another operation to be performed by the memory device. In the shown example, the first request is a request to perform a program operation to program first data into the memory device.

In some implementations, the memory controller includes a cache having a size that is smaller than a size of the first data. After receiving the first request to program the first data, the memory controller can store a portion of the first data in the cache, and send the portion of the first data to the memory device until all portions of the first data are sent. In the shown example, the first request includes at least a first portion and a second portion. Each of the first and second portion has a size equal to or smaller than the size of the cache of the memory controller. The memory controller can store the first portion of the first data into the cache, and send the first portion of the first data to the memory device (1104).

After receiving the first portion of the first data from the memory controller, the memory device can store the first portion of the first data in a buffer of the memory device. In some implementations, the memory device includes a first buffer, a second buffer, and a third buffer. In some implementations, the third buffer includes a plurality of data buffers. In some example, the first buffer can be implemented as cache storage 708 or cache buffer 804, the second buffer can be implemented as storage unit 710 or internal buffer 804, and the third buffer can be implemented as data storage units 706 or data buffer 806.

In the shown example, the memory device receives and stores the first portion of the first data in the first buffer or the third buffer of the memory device (1106). In some examples, prior to storing the first portion of the first data in the third buffer, the memory device stores the first portion of the first data in the first buffer, and moves the first portion of the first data from the first buffer to the third buffer. In some examples, when the third buffer includes a plurality of data buffers, the memory device can store the first portion of the first data in one of the data buffers of the third buffer.

While transferring the first portion of the first data to the memory device, the memory controller can monitor and determine whether a second request is received and whether the data transfer of the first portion of the first data is completed. In the shown example, the memory controller receives a second request from the host (1108). The memory device determines that the second request is associated with a second operation that has a higher execution priority than the first operation (1110) so that the first operation can be suspended and preempted by the second operation. As an example, the second request can be a request to read data from the memory device. As another example, the second request can be a request to program data other than the first data into the memory device before the program operation to program the first data is completed.

In some implementations, the memory controller can perform the check of whether a second request is received once, periodically, or from time to time. As an example, the memory controller can perform the check repeatedly at predetermined frequencies, e.g., every 1 us, 10 us, or 50 us. As another example, the memory controller can perform the check prior to or during the transfer of each portion of the first data.

In some implementations, in response to determining that no second request (or no request including an operation with a higher execution priority than that of the current first operation) is received, the data transfer will continue and a next portion of the first data will be transferred from the memory controller to the memory device.

In some implementations, in response to determining that the second request is received and that data transfer of the first portion of the first data is not complete, the memory controller can wait for the data transfer of the first portion of the first data to complete.

In response to determining that the second request is received and that data transfer of the first portion of the first data is complete, the memory controller sends the second request to the memory device (1112). In some implementations, the memory controller can send a suspend command along with the second request to the memory device. The suspend command can request the memory device to temporarily suspend a current operation(s) and to perform another operation(s) indicated by the second request.

In some implementations, the second command sent by the memory controller to the memory device may have a different format than the second request received by the memory controller from the host. For example, the second request sent by the memory controller to the memory device can be generated by the memory controller based on information included in the second request received by the memory controller from the host, for example, to indicate the read operation to read data from the memory device. The second request sent by the memory controller to the memory device can include, for example, additional or different data fields, control information, or have a different format than the second request received by the memory controller from the host.

By halting or interrupting an in-process first operation even before the data transfer of the first operation from the memory controller to the memory device is complete, the memory system can react more promptly to the second request (e.g., a read command) that has a higher execution priority. Advantageously, in some implementations, the first operation can be suspended substantially simultaneously with the identification of the second command to reduce or limit operation latency of the second operation, e.g., in view of applicable QoS metrics in a mixed write and read workload environment.

After receiving the second request from the memory controller, the memory device can interrupt or halt a current operation. The memory device can also store the already received data for the first operation and context of an execution status for the first operation in an internal memory of the memory device. In the shown example, in response to receiving the second request, the memory device moves the first portion of the first data from the first buffer, or from the third buffer in cases where the first portion of the first data has already been moved from the first buffer to the third buffer, to the second buffer of the memory device (1114). By moving the first portion of the first data to the second buffer, the memory device can release the space in the first buffer and the third buffer for the operation indicated by the second request.

After moving the first portion of the first data to the second buffer, the memory device proceeds with execution of the second operation following the suspension of the first operation (e.g., the program operation), resulting in little to no delay in servicing the second request. In a memory system operating with a mixed workload, suspending the data transfer of the first operation enables the second operation to be serviced without having to wait for the transfer of the remaining data for an in-progress first operation to complete. As a result, the latency of the memory system can be significantly reduced in some instances.

In the shown example, the memory device performs the second operation in response to the second request without using the second buffer (1116). In some examples, when the second request includes an SLC program command for programming second data into the memory device, the memory device can store the second data in the first buffer, move the second data from the first buffer to the third buffer, and program the second data into the memory cell array of the memory device. In some examples, when the second request includes a read command to read data from the memory device, the memory device can read the data from the memory cell array of the memory device, store the data in the third buffer, move the data from the third buffer to the first buffer, and send the data to the memory controller from the first buffer.

After performing the second operation in response to the second request, the memory device sends an execution result of the second request to the memory controller (1118). For example, the memory device can send the data obtained from the memory cell array of the memory device as a result of performing a read operation indicated by the second request. As another example, the memory device can send an indication to the memory controller indicating that data have been programmed into the memory cell array of the memory device when the second request indicates an operation to program the data into the memory device.

In addition to sending the execution result of the second request to the memory controller, the memory device moves the first portion of the first data from the second buffer to the third buffer (1120). In some examples where the memory device moves the first portion of the first data from a data buffer of the third buffer to the second buffer prior to fulfilling the second request, the memory device can move the first portion of the first data from the second buffer back to the same data buffer of the third buffer.

The memory controller, after receiving the execution result of the second request from the memory device, sends the second portion of the first data to the memory device (1122). In some implementations, the memory controller can send a resume command along with the second portion of the first data to the memory device to resume the first operation and to continue to transfer the second portion of the first data. In some implementations, the memory controller can obtain the second portion of the first data from the host after receiving the execution result of the second request from the memory device.

In response to receiving the second portion of the first data from the memory controller, the memory device stores the second portion of the first data in the first buffer (1124). In some examples, the memory device receives a resume command from the memory controller, restores the context for the first operation, and continues to execute the first operation by storing the second portion of the first data.

Then, the memory device moves the second portion of the first data from the first buffer to the third buffer (1126). In some implementations, when the memory device stores the first portion of the first data in a data buffer of the third buffer, the memory device can store the second portion of the first data in another data buffer of the third buffer.

After all portions of the first data have been received and stored by the memory device in the third buffer, the memory device performs the first operation in response to the first request (1130). For example, the memory device can perform a program operation to program the first data, including the first portion and the second portion, into the memory cell array of the memory device.

In some implementations, prior to performing the first operation in response to the first request, the memory device can receive an indication from the memory controller indicating all data of the first request have been sent. In the shown example, the memory controller sends an indication of completion of data transfer of the first data to the memory device prior to the memory device performing the first operation (1128).

Figure 12:
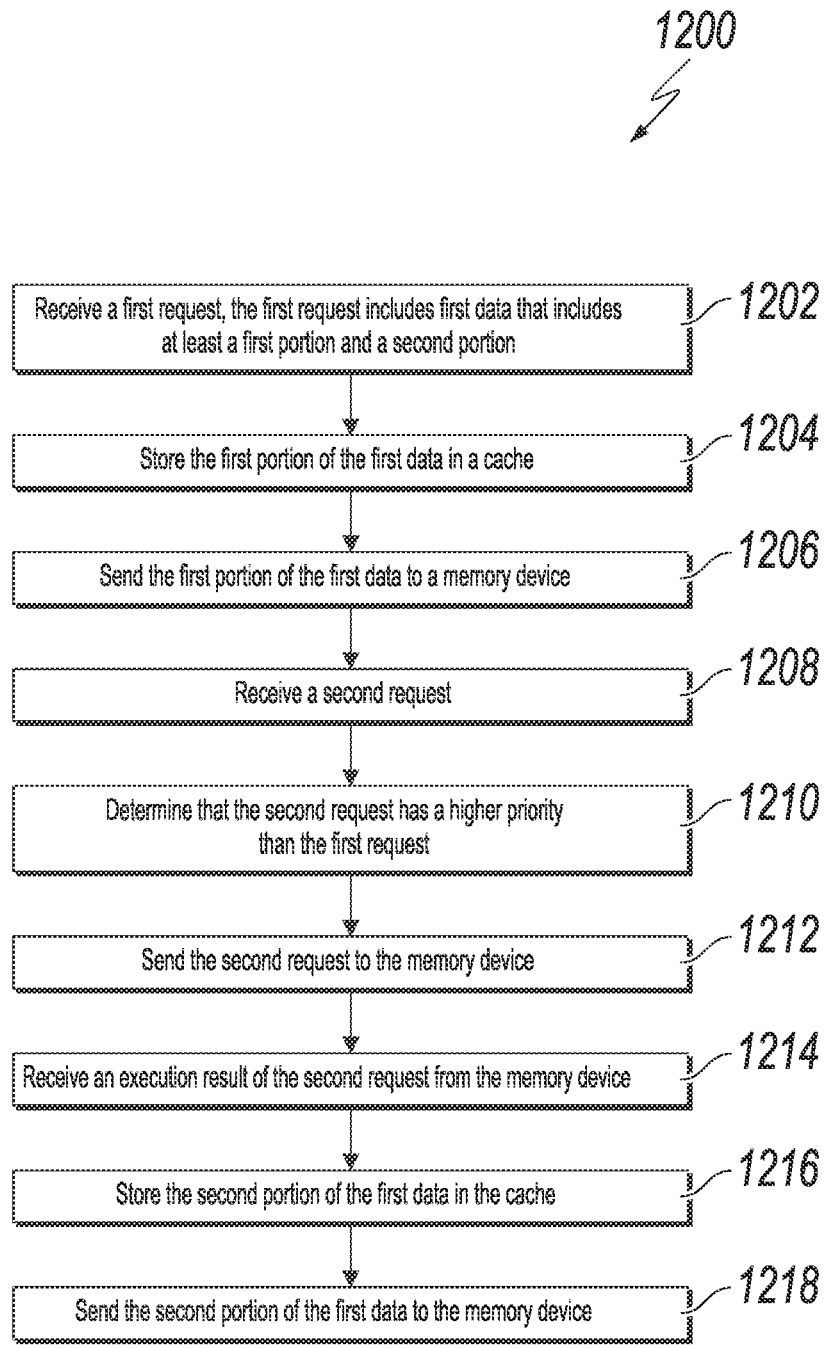
FIG. 12 shows a flowchart of an example process performed by a memory controller, in accordance with one or more implementations of the present disclosure.

FIG. 12 shows a flowchart of an example process 1200 for managing operations by a memory controller in a memory system, in accordance with some aspects of the present disclosure. The example process 1200 can be performed by any suitable device disclosed herein, such as the memory controller 106, 306, or 406. The example process 1200 will be described as being performed by a memory controller of a memory system having the memory controller and a memory device, programmed appropriately in accordance with this disclosure. In some implementations, some or all of the operations in the example process 1200 can be implemented based on the techniques described in connection with FIGS. 1-11. The operations shown in process 1200 may not be exhaustive and that other operations can be performed as well before, after, or between any of the illustrated operations. Further, some of the operations may be performed simultaneously, or in a different order than shown in FIG. 12.

In the shown example, process 1200 starts where the memory controller receives a first request (1202). The memory controller may receive the first request from a host device. The first request can be a request to perform a first operation on a memory device. The first operation can be, for example, a program operation to program first data into the memory cell array of the memory device. The first data includes at least a first portion and a second portion. Each of the first and second portion can have a size equal to or smaller than the size of a cache of the memory controller. Then, the memory controller stores the first portion of the first data into the cache (1204), and send the first portion of the first data to the memory device (1206).

While transferring the first portion of the first data to the memory device, the memory controller can monitor and determine whether a second request is received and whether the data transfer is completed. In the shown example, the memory controller receives a second request (1208). As an example, the second request can be a request to read data from the memory device. As another example, the second request can be a request to program data other than the first data into the memory device before the first operation to program the first data is completed. The memory device determines that the second request is associated with a second operation that has a higher execution priority than the first operation (1210) so that the first operation can be suspended and preempted by the second operation.

In response to determining that the second request is associated with a second operation that has a higher execution priority than the first operation indicated by the first request, the memory controller sends the second request to the memory device (1212). In some implementations, the memory controller can send a suspend command along with the second request to the memory device. The suspend command can request the memory device to temporarily suspend a current operation(s) and to perform another operation(s) indicated by the second request.

The memory controller receives an execution result of the second request from the memory device (1214) after the memory device performs the second operation in response to the second request. For example, the memory device can send the data obtained from the memory cell array of the memory device as a result of performing a read operation indicated by the second request. As another example, the memory device can send an indication to the memory controller indicating that data have been programmed into the memory cell array of the memory device when the second request indicates an operation to program the data into the memory device.

After sending the first portion of the first data to the memory device, the memory controller can release its cache space that was used to store the first portion of the first data, store the second portion of the first data in the cache (1216), and send the second portion of the first data to the memory device (1218).

In some implementations, if the first data includes more than the first portion and the second portion, the memory controller can continue to transfer the remaining portions of the first data until all portions of the first data have been transferred to the memory device.

Figure 13:
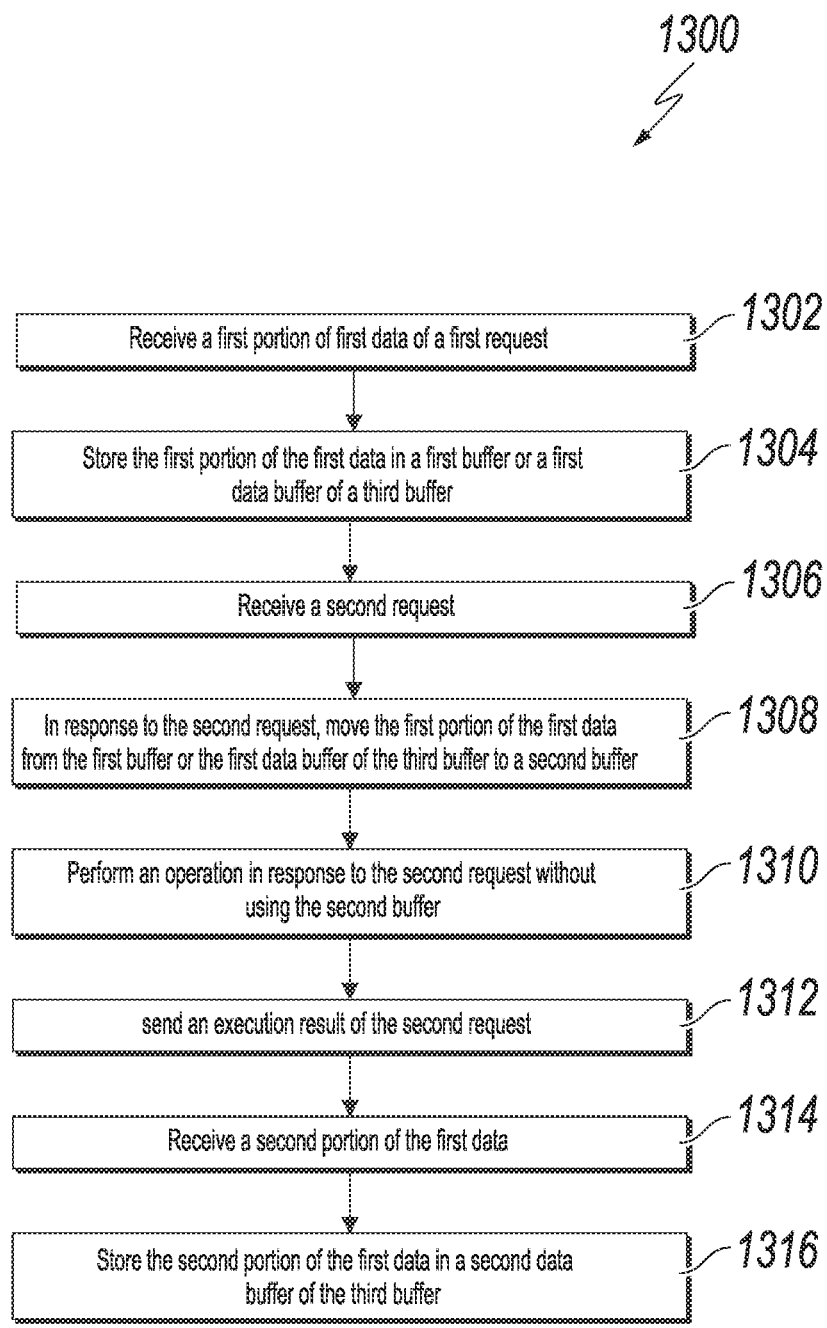
FIG. 13 shows a flowchart of an example process performed by a memory device, in accordance with one or more implementations of the present disclosure.

FIG. 13 shows a flowchart of an example process 1300 for managing operations by a memory device in a memory system, in accordance with some aspects of the present disclosure. The example process 1300 can be performed by any suitable memory device disclosed herein, such as the memory device 104, 304, 404, or 502. The example process 1300 will be described as being performed by a memory device of a memory system having a memory controller and the memory device, programmed appropriately in accordance with this disclosure. In some implementations, some or all of the operations in the example process 1300 can be implemented based on the techniques described in connection with FIGS. 1-11. The operations shown in method 1300 may not be exhaustive and that other operations can be performed as well before, after, or between any of the illustrated operations. Further, some of the operations may be performed simultaneously, or in a different order than shown in FIG. 13.

The memory device receives a first portion of first data of a first request from the memory controller (1302). In some implementations, the first request is a request to perform a first operation on the memory device. The first operation can be, for example, a program operation, an erase operation, or another operation to be performed by the memory device. In the shown example, the first request is a request to program the first data into the memory device.

In some implementations, the memory device includes a first buffer, a second buffer, and a third buffer. In some implementations, the third buffer includes a plurality of data buffers. In some examples, the first buffer can be implemented as cache storage 708 or cache buffer 804, the second buffer can be implemented as storage unit 710 or internal buffer 804, and the third buffer can be implemented as data storage units 706 or data buffer 806.

After receiving the first portion of the first data from the memory controller, the memory device stores the first portion of the first data in a first buffer or a first data buffer of a third buffer of the memory device (1304).

Prior to storing the first portion of the first data in the first data buffer of the third buffer, the memory device can store the first portion of the first data in the first buffer, and move the first portion of the first data from the first buffer to the first data buffer of the third buffer.

The memory device receives a second request from the memory controller (1306) after receiving the first portion of the first data. In some implementations, the second request is associated with a second operation that has a higher execution priority than the first operation so that the first operation can be suspended and preempted by the second operation. As an example, the second request can be a request to read data from the memory device. As another example, the second request can be a request to program data other than the first data into the memory device.

After receiving the second request from the memory controller, the memory device can interrupt or halt a current operation. The memory device can also store the already received data for the first operation and context of an execution status for the first operation in an internal memory of the memory device. In the shown example, in response to receiving the second request, the memory device moves the first portion of the first data from the first buffer, or from the first data buffer of the third buffer in cases where the first portion of the first data has already been moved from the first buffer to the first data buffer, to the second buffer of the memory device (1308). By moving the first portion of the first data to the second buffer, the memory device can release the space in the first buffer or the third buffer for the operation indicated by the second request.

After moving the first portion of the first data to the second buffer, the memory device proceeds with execution of the second operation following the suspension of the first operation (e.g., the program operation), resulting in little to no delay in servicing the second request. In a memory system operating with a mixed workload, suspending the data transfer of the first operation enables the second operation to be serviced without having to wait for the transfer of the remaining data for an in-progress first operation to complete. As a result, the latency of the memory system can be significantly reduced in some instances.

In the shown example, the memory device performs the second operation in response to the second request without using the second buffer (1310). In some examples where the second request includes an SLC program command for programming second data into the memory device, the memory device can store the second data in the first buffer, move the second data from the first buffer to the third buffer, and program the second data into a memory cell array of the memory device. In some examples where the second request includes a read command for reading data from the memory device, the memory device can read the data from the memory cell array, store the data in the third buffer, move the data from the third buffer to the first buffer, and send the data to the memory controller from the first buffer.

After performing the second operation in response to the second request, the memory device sends an execution result of the second request to the memory controller (1312). For example, the memory device can send the data obtained from the memory cell array of the memory device as a result of performing a read operation indicated by the second request. As another example, the memory device can send an indication to the memory controller indicating that data have been programmed into the memory cell array of the memory device when the second request indicates an operation to program the data into the memory device.

In addition to sending the execution result of the second request to the memory controller, the memory device can move the first portion of the first data from the second buffer to the third buffer. In some examples where the memory device moves the first portion of the first data from a data buffer of the third buffer to the second buffer prior to fulfilling the second request, the memory device can move the first portion of the first data from the second buffer back to the same data buffer of the third buffer.

The memory device continues to receive the second portion of the first data from the memory controller (1314), and stores the second portion of the first data in a second data buffer of the third buffer (1316). In some examples, prior to storing the second portion of the first data in the second data buffer of the third buffer, the memory device stores the second portion of the first data in the first buffer of the memory device, and moves the second portion of the first data from the first buffer to the second data buffer of the third buffer.

After all portions of the first data have been received and stored by the memory device in the third buffer, the memory device performs the first operation in response to the first request. For example, the memory device can perform a program operation to program the first data, including the first portion and the second portion, into the memory cell array of the memory device.

In some implementations, prior to performing the first operation in response to the first request, the memory device can receive an indication from the memory controller indicating all data of the first request have been sent. For example, the memory controller can send an indication of completion of data transfer of the first data to the memory device.

According to one aspect of the present disclosure, a method performed by a memory device is disclosed. The method includes: receiving, by the memory device comprising a first buffer, second buffer, and a third buffer, a first portion of first data of a first request from a memory controller, wherein the first request comprises at least the first portion of the first data and a second portion of the first data, and wherein the third buffer comprises a plurality of data buffers; storing, by the memory device, the first portion of the first data in the first buffer or a first data buffer of the third buffer; receiving, by the memory device, a second request from the memory controller; in response to the second request, moving, by the memory device, the first portion of the first data from the first buffer or the first data buffer of the third buffer to the second buffer; performing, by the memory device, an operation in response to the second request without using the second buffer; sending, by the memory device, an execution result of the second request to the memory controller; receiving, by the memory device, the second portion of the first data from the memory controller; and storing, by the memory device, the second portion of the first data in a second data buffer of the third buffer.

In some implementations, the method further includes: moving, by the memory device, the first portion of the first data from the second buffer to the first data buffer of the third buffer; performing, by the memory device, an operation in response to the first request using the first portion and the second portion of the first data in the third buffer; and sending, by the memory device, an execution result of the first request to the memory controller.

In some implementations, the first request includes a triple-level cell (TLC) program command or a quad-level cell (QLC) program command. Performing, by the memory device, the operation in response to the first request includes: programing, by the memory device, the first portion and the second portion of the first data of the first request in the third buffer into an array of memory cells of the memory device.

In some implementations, the second request includes a single-level cell (SLC) program command for programming second data into the memory device. Performing, by the memory device, the operation in response to the second request without using the second buffer includes: storing, by the memory device, the second data in the first buffer; moving, by the memory device, the second data from the first buffer to the first data buffer of the third buffer; and programing, by the memory device, the second data into an array of memory cells of the memory device.

In some implementations, the second request comprises a read command.

In some implementations, the method further includes: receiving, by the memory device, a suspension request requesting the memory device to suspend a current operation and to perform the second request; and after sending the execution result of the second request to the memory controller, resuming, by the memory device, one or more operations of the first request.

In some implementations, storing, by the memory device, the second portion of the first data in the second data buffer of the third buffer includes: storing, by the memory device, the second portion of the first data in the first buffer; and moving, by the memory device, the second portion of the first data from the first buffer to the second data buffer of the third buffer.

According to another aspect of the present disclosure, a memory device is disclosed. The memory device includes a first buffer, a second buffer, a third buffer including a plurality of data buffers, an array of memory cells, and a control logic. The control logic is coupled to at least one memory storing programming instructions that, when executed by the control logic, cause the memory device to perform operations including: receiving a first portion of first data of a first request from a memory controller, wherein the first request comprises at least the first portion of the first data and a second portion of the first data; storing the first portion of the first data in the first buffer or a first data buffer of the third buffer; receiving a second request from the memory controller; in response to the second request, moving the first portion of the first data from the first buffer or the first data buffer of the third buffer to the second buffer; performing an operation in response to the second request without using the second buffer; sending an execution result of the second request to the memory controller; receiving the second portion of the first data from the memory controller; and storing the second portion of the first data in a second data buffer of the third buffer.

In some implementations, the operations further include: moving the first portion of the first data from the second buffer to the first data buffer of the third buffer; performing an operation in response to the first request using the first portion and the second portion of the first data in the third buffer; and sending an execution result of the first request to the memory controller.

In some implementations, the first request includes a triple-level cell (TLC) program command or a quad-level cell (QLC) program command. Performing the operation in response to the first request includes: programing the first portion and the second portion of the first data in the third buffer into an array of memory cells of the memory device.

In some implementations, the second request includes a single-level cell (SLC) program command for programming second data into the memory device. Performing the operation in response to the second request without using the second buffer includes: storing the second data in the first buffer; moving the second data from the first buffer to the first data buffer of the third buffer; and programming the second data into an array of memory cells of the memory device.

In some implementations, the second request comprises a read command.

In some implementations, the operations includes: receiving a suspension request requesting the memory device to suspend a current operation and to perform the second request; and after sending the execution result of the second request to the memory controller, resuming one or more operations of the first request.

In some implementations, storing the second portion of the first data in the second data buffer of the third buffer includes: storing the second portion of the first data in the first buffer; and moving the second portion of the first data from the first buffer to the second data buffer of the third buffer.

According to another aspect of the present disclosure, a system that includes a memory device and a memory controller is disclosed. The memory device includes a first buffer, a second buffer, a third buffer including a plurality of data buffers, an array of memory cells, and a control logic. The control logic is coupled to at least one memory storing programming instructions that, when executed by the control logic, cause the memory device to perform operations including: receiving a first portion of first data of a first request from a memory controller, wherein the first request comprises at least the first portion of the first data and a second portion of the first data; storing the first portion of the first data in the first buffer or a first data buffer of the third buffer; receiving a second request from the memory controller; in response to the second request, moving the first portion of the first data from the first buffer or the first data buffer of the third buffer to the second buffer; performing an operation in response to the second request without using the second buffer; sending an execution result of the second request to the memory controller; receiving the second portion of the first data from the memory controller; and storing the second portion of the first data in a second data buffer of the third buffer.

In some implementations, the first request includes a triple-level cell (TLC) program command or a quad-level cell (QLC) program command.

In some implementations, the second request includes a single-level cell (SLC) program command.

In some implementations, the second request includes a read command.

In some implementations, the memory controller includes a cache and a processor coupled to the cache, and the processor is configured to: prior to sending the second portion of the first data to the memory device, storing the second portion of the first data in the cache of the memory controller, wherein a size of the second portion of the first data does not exceed a size of the cache of the memory controller.

In some implementations, a size of the first data exceeds a size of the cache of the memory controller, and the processor is further configure to: prior to sending the first portion of the first data to the memory device, storing the first portion of the first data in the cache of the memory controller, wherein a size of the first portion of the first data does not exceeds the size of the cache of the memory controller.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described example implementations, but should be defined only in accordance with the following claims and their equivalents. Accordingly, other implementations also are within the scope of the claims.

What is claimed is:

1. A method, comprising:
    receiving, by a memory device comprising a first buffer, second buffer, and a third buffer, a first portion of first data of a first request from a memory controller, wherein the first request comprises at least the first portion of the first data and a second portion of the first data, and wherein the third buffer comprises a plurality of data buffers;
    storing, by the memory device, the first portion of the first data in the first buffer or a first data buffer of the third buffer;
    receiving, by the memory device, a second request from the memory controller;
    in response to the second request, moving, by the memory device, the first portion of the first data from the first buffer or the first data buffer of the third buffer to the second buffer;
    performing, by the memory device, an operation in response to the second request without using the second buffer;
    sending, by the memory device, an execution result of the second request to the memory controller;
    receiving, by the memory device, the second portion of the first data from the memory controller; and
    storing, by the memory device, the second portion of the first data in a second data buffer of the third buffer.

2. The method of claim 1, further comprising:
    moving, by the memory device, the first portion of the first data from the second buffer to the first data buffer of the third buffer;
    performing, by the memory device, an operation in response to the first request using the first portion and the second portion of the first data in the third buffer; and
    sending, by the memory device, an execution result of the first request to the memory controller.

3. The method of claim 2, wherein:
    the first request comprises a triple-level cell (TLC) program command or a quad-level cell (QLC) program command; and
    performing, by the memory device, the operation in response to the first request comprises:
        programing, by the memory device, the first portion and the second portion of the first data of the first request in the third buffer into an array of memory cells of the memory device.

4. The method of claim 1, wherein:
    the second request comprises a single-level cell (SLC) program command for programming second data into the memory device; and
    performing, by the memory device, the operation in response to the second request without using the second buffer comprises:
        storing, by the memory device, the second data in the first buffer;
        moving, by the memory device, the second data from the first buffer to the first data buffer of the third buffer; and
        programing, by the memory device, the second data into an array of memory cells of the memory device.

5. The method of claim 1, wherein the second request comprises a read command.

6. The method of claim 1, further comprising:
    receiving, by the memory device, a suspension request requesting the memory device to suspend a current operation and to perform the second request; and
    after sending the execution result of the second request to the memory controller, resuming, by the memory device, one or more operations of the first request.

7. The method of claim 1, wherein storing, by the memory device, the second portion of the first data in the second data buffer of the third buffer comprises:
    storing, by the memory device, the second portion of the first data in the first buffer; and
    moving, by the memory device, the second portion of the first data from the first buffer to the second data buffer of the third buffer.

8. A memory device, the memory device comprising:
    a first buffer;
    a second buffer;
    a third buffer comprising a plurality of data buffers;
    an array of memory cells; and
    a control logic coupled to at least one memory storing programming instructions that, when executed by the control logic, cause the memory device to perform operations comprising:
        receiving a first portion of first data of a first request from a memory controller, wherein the first request comprises at least the first portion of the first data and a second portion of the first data;
        storing the first portion of the first data in the first buffer or a first data buffer of the third buffer;
        receiving a second request from the memory controller;
        in response to the second request, moving the first portion of the first data from the first buffer or the first data buffer of the third buffer to the second buffer;
        performing an operation in response to the second request without using the second buffer;
        sending an execution result of the second request to the memory controller;
        receiving the second portion of the first data from the memory controller; and
        storing the second portion of the first data in a second data buffer of the third buffer.

9. The memory device of claim 8, wherein the operations further comprise:
    moving the first portion of the first data from the second buffer to the first data buffer of the third buffer;
    performing an operation in response to the first request using the first portion and the second portion of the first data in the third buffer; and sending an execution result of the first request to the memory controller.

10. The memory device of claim 9, wherein:
the first request comprises a triple-level cell (TLC) program command or a quad-level cell (QLC) program command; and
performing the operation in response to the first request comprises:
programming the first portion and the second portion of the first data in the third buffer into an array of memory cells of the memory device.

11. The memory device of claim 8, wherein:
the second request comprises a single-level cell (SLC) program command for programming second data into the memory device; and
performing the operation in response to the second request without using the second buffer comprises:
storing the second data in the first buffer;
moving the second data from the first buffer to the first data buffer of the third buffer; and
programing the second data into an array of memory cells of the memory device.

12. The memory device of claim 8, wherein the second request comprises a read command.

13. The memory device of claim 8, wherein the operations comprise:
receiving a suspension request requesting the memory device to suspend a current operation and to perform the second request; and
after sending the execution result of the second request to the memory controller, resuming one or more operations of the first request.

14. The memory device of claim 8, wherein storing the second portion of the first data in the second data buffer of the third buffer comprises:
storing the second portion of the first data in the first buffer; and
moving the second portion of the first data from the first buffer to the second data buffer of the third buffer.

15. A system, the system comprising a memory controller and a memory device, wherein the memory device comprises:
a first buffer;
a second buffer;
a third buffer comprising a plurality of data buffers;
an array of memory cells; and
a control logic coupled to at least one memory storing programming instructions that, when executed by the control logic, cause the memory device to perform operations comprising:
receiving a first portion of first data of a first request from the memory controller, wherein the first request comprises at least the first portion of the first data and a second portion of the first data;
storing the first portion of the first data in the first buffer or a first data buffer of the third buffer;
receiving a second request from the memory controller;
in response to the second request, moving the first portion of the first data from the first buffer or the first data buffer of the third buffer to the second buffer;
performing an operation in response to the second request without using the second buffer;
sending an execution result of the second request to the memory controller;
receiving the second portion of the first data from the memory controller; and
storing the second portion of the first data in a second data buffer of the third buffer.

16. The system of claim 15, wherein:
the first request comprises a triple-level cell (TLC) program command or a quad-level cell (QLC) program command.

17. The system of claim 15, wherein the second request comprises a single-level cell (SLC) program command.

18. The system of claim 15, wherein the second request comprises a read command.

19. The system of claim 15, wherein the memory controller comprises a cache and a processor coupled to the cache, and wherein the processor is configured to:
prior to sending the second portion of the first data to the memory device, storing the second portion of the first data in the cache of the memory controller, wherein a size of the second portion of the first data does not exceed a size of the cache of the memory controller.

20. The system of claim 19, wherein a size of the first data exceeds a size of the cache of the memory controller, and the processor is further configure to:
prior to sending the first portion of the first data to the memory device, storing the first portion of the first data in the cache of the memory controller, wherein a size of the first portion of the first data does not exceeds the size of the cache of the memory controller.

* * * * *